(12) United States Patent
Kim et al.

(10) Patent No.: US 12,414,043 B2
(45) Date of Patent: Sep. 9, 2025

(54) TRANSMISSION OF POWER STATE INFORMATION FOR MULTI-LINK DEVICE

(71) Applicant: LG Electronics Inc., Seoul (KR)

(72) Inventors: Jeongki Kim, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 18/017,270

(22) PCT Filed: May 28, 2021

(86) PCT No.: PCT/KR2021/006677
§ 371 (c)(1),
(2) Date: Jan. 20, 2023

(87) PCT Pub. No.: WO2022/019466
PCT Pub. Date: Jan. 27, 2022

(65) Prior Publication Data
US 2023/0284144 A1    Sep. 7, 2023

(30) Foreign Application Priority Data
Jul. 22, 2020   (KR) .................. 10-2020-0091140

(51) Int. Cl.
*H04W 52/02*   (2009.01)
*H04L 1/1607*   (2023.01)
(Continued)

(52) U.S. Cl.
CPC ....... *H04W 52/0235* (2013.01); *H04L 1/1621* (2013.01); *H04W 28/0278* (2013.01); *H04W 84/12* (2013.01)

(58) Field of Classification Search
CPC ............... H04L 1/1614; H04L 1/1835; H04W 28/0278; H04W 52/02; H04W 52/0235;
(Continued)

(56) References Cited

U.S. PATENT DOCUMENTS

2020/0045635 A1*   2/2020 Lin .................. H04W 52/0235
2020/0107260 A1    4/2020 Gucea
(Continued)

FOREIGN PATENT DOCUMENTS

KR   20170012273   2/2017
KR   20180021854   3/2018

OTHER PUBLICATIONS

Chu et al., "Multi-Link Power Save," IEEE 802.11-19/1617r2, Sep. 2019, 10 pages.
(Continued)

*Primary Examiner* — Harun Chowdhury
(74) *Attorney, Agent, or Firm* — Fish & Richardson P.C.

(57) ABSTRACT

In a wireless local area network system, a reception MLD may include a plurality of reception stations (STAs). The reception MLD may receive, from a transmission MLD, a first physical protocol data unit (PPDU) including data. The reception MLD may transmit, to the transmission MLD, a block acknowledgement (ACK) (BA) frame regarding the first PPDU. The BA frame may include a first association identifier (AID) information field and a second AID information field. The first AID information field may include a first AID field related to an AID of the transmission MLD and an ACK information field regarding the data. The second AID information field may include a second AID field and a power state information field related to whether the plurality of reception STAs are in an awake state or in a doze state, on the basis of the second AID field having a first value.

15 Claims, 29 Drawing Sheets

(51) Int. Cl.
*H04W 28/02* (2009.01)
*H04W 84/12* (2009.01)

(58) Field of Classification Search
CPC ............. H04W 72/30; H04W 74/0808; H04W 74/0816
USPC ........................................ 370/312, 329, 338
See application file for complete search history.

(56) References Cited

U.S. PATENT DOCUMENTS

| | | | |
|---|---|---|---|
| 2021/0227502 A1* | 7/2021 | Huang | H04L 1/1614 |
| 2021/0282209 A1* | 9/2021 | Jiang | H04W 74/0816 |

OTHER PUBLICATIONS

Chu et al., "Multiple Link Operation Follow Up," IEEE 802.11-20/0487r5, Mar. 2020, 15 pages.

* cited by examiner (a)

| Variant | B0 | B1 | B2-B29 | B30 | B31 |
|---|---|---|---|---|---|
| HT | 0 | | HT Control Middle | AC Constraint | RDG/More PPDU |
| VHT | 1 | 0 | VHT Control Middle | AC Constraint | RDG/More PPDU |
| HE | 1 | 1 | A-Control | | |

FIG. 14

| Control ID (NMB) | Queue Size All |
|---|---|

FIG. 15

| Control ID (NMB) | Scaling Factor | Queue Size All |
|---|---|---|

FIG. 16

| B0 | B1 | B2 | B3 |
|---|---|---|---|
| AC_BE | AC_BK | AC_VI | AC_VO |

FIG. 17

| Control ID (NMB) | ACI Bitmap | Delta TID | ACI High | Scaling Factor | Queue Size High | Queue Size All |

FIG. 18

| ACI Bitmap | Delta TID | ACI High | Scaling Factor | Queue Size High | Queue Size All |
|---|---|---|---|---|---|
| 4 | 2 | 2 | 2 | 8 | 8 |

B0　B3 B4　B5 B6　B7 B8　B9 B10　B17 B18　B25

Bits:

TRANSMISSION OF POWER STATE INFORMATION FOR MULTI-LINK DEVICE

CROSS-REFERENCE TO RELATED APPLICATIONS

This application is a National Stage application under 35 U.S.C. § 371 of International Application No. PCT/KR2021/006677, filed on May 28, 2021, which claims the benefit of Korean Patent Application No. 10-2020-0091140, filed on Jul. 22, 2020. The disclosures of the prior applications are incorporated by reference in their entirety.

TECHNICAL FIELD

The present specification relates to a method for transmitting power state information by a multi-link device (MLD) in a wireless local area network (WLAN) system.

BACKGROUND

A wireless local area network (WLAN) has been enhanced in various ways. For example, the Institute of Electrical and Electronics Engineers (IEEE) 802.1 lax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11 be standard.

SUMMARY

In a wireless local area network (WLAN) system according to various embodiments, a receiving MLD may include a plurality of receiving stations (STAs). The receiving MLD may receive a first physical protocol data unit (PPDU) including data from the transmitting MLD. The receiving MLD may transmit a block acknowledgment (BA) frame for the first PPDU to the transmitting MLD. The BA frame may include a first association identifier (AID) information field and a second AID information field. The first AID information field may include a first AID field related to the AID of the transmission MLD and an ACK information field for the data. The second AID information field may include a power state information field related to whether the plurality of receiving STAs are in an awake state or a doze state based on the second AID field and the second AID field having a first value.

According to an example of the present specification, the non-AP MLD may quickly inform the AP MLD of the awake state of a specific STA. The receiving MLD may transmit power state information of internal STAs. Accordingly, the transmitting MLD may transmit data based on the power state information of STAs inside the receiving MLD. In data transmission between MLDs including a plurality of STAs, since the transmitting MLD can know which link STAs are in an awake state and which link STAs are in a doze state, data transmission can be performed efficiently.

According to an example of the present specification, since power state information can be included using a specific AID of the BA frame, the structure of the existing BA frame can be used as it is, and compatibility with previous WLAN systems can be secured.

BRIEF DESCRIPTION OF THE DRAWINGS

FIG. 11 is a diagram illustrating an embodiment of an HT Control field.

FIG. 14 shows an example of a Non-AP BSR (NMB) Control subfield.

FIG. 15 is a diagram showing an embodiment of the NMB Control subfield.

FIG. 16 shows an example of ACI Bitmap subfield encoding.

FIG. 17 shows an example of NMB Control Subfield.

FIG. 18 is a diagram showing an example of a format of a BSR Control subfield in an 11ax system.

DETAILED DESCRIPTION

Figure 1:
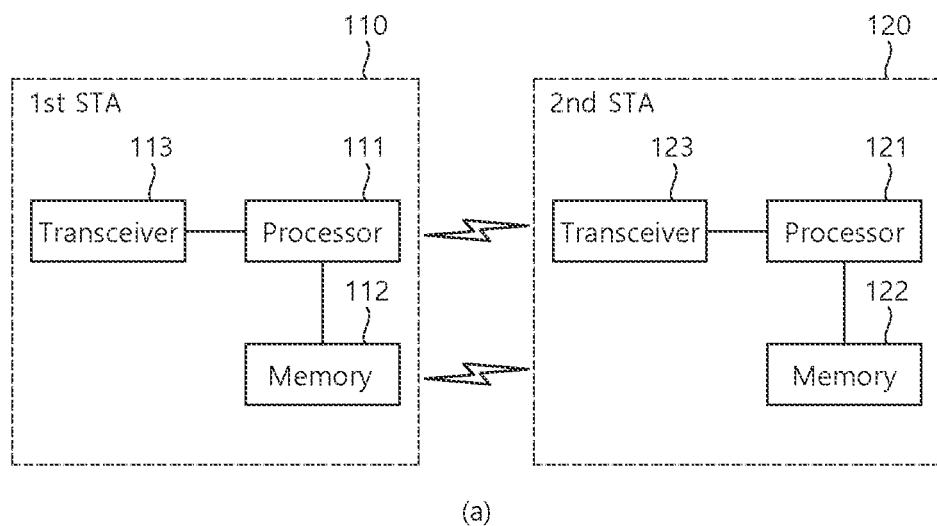
FIG. 1 shows an example of a transmitting apparatus and/or receiving apparatus of the present specification.
Figure 1:
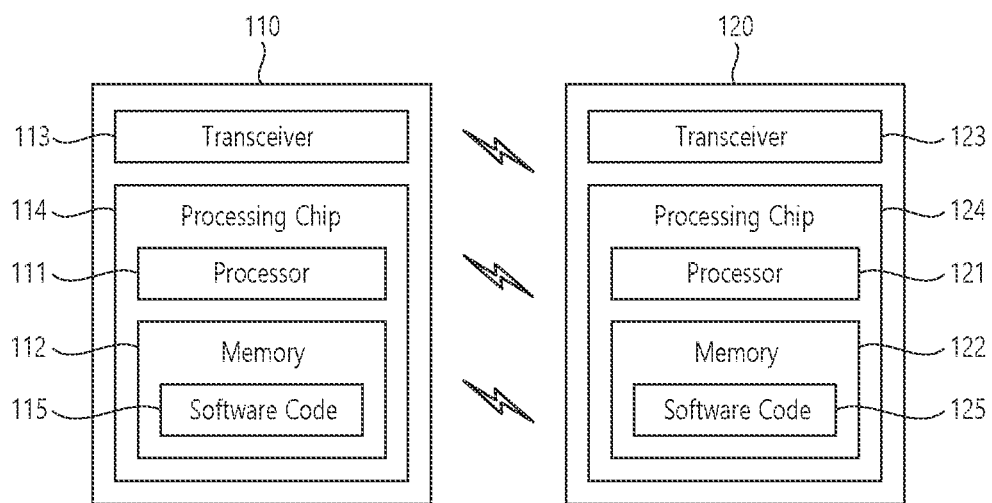

In the present specification, "A or B" may mean "only A", "only B" or "both A and B". In other words, in the present specification, "A or B" may be interpreted as "A and/or B". For example, in the present specification, "A. B. or C" may mean "only A", "only B", "only C", or "any combination of A, B, C".

A slash (/) or comma used in the present specification may mean "and/or". For example, "A/B" may mean "A and/or B". Accordingly. "A/B" may mean "only A". "only B", or "both A and B". For example, "A, B. C" may mean "A, B. or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B. and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11 be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU: 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU: 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung), A series of processors made by Apple®, HELIO™ series of processors made by MediaTek®, ATOM™ series of processors made by Intel®, or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
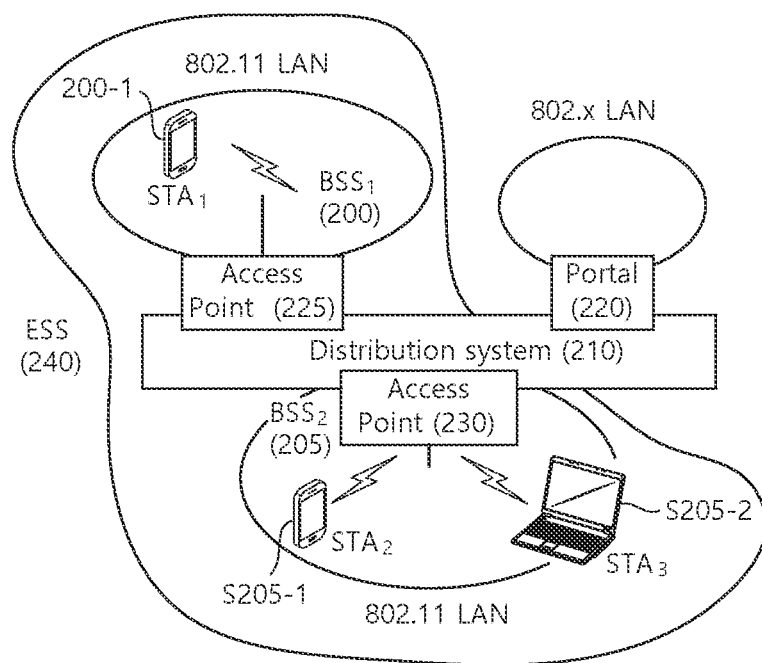
FIG. 2 is a conceptual view illustrating the structure of a wireless local area network (WLAN).
Figure 2:
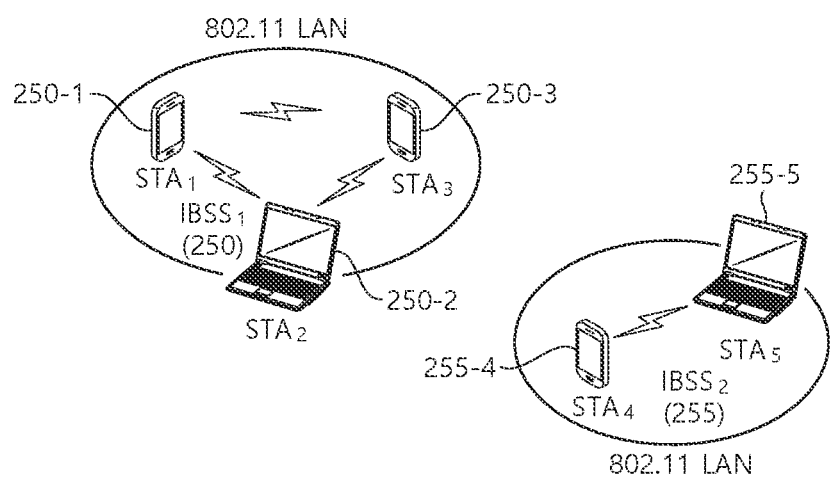

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
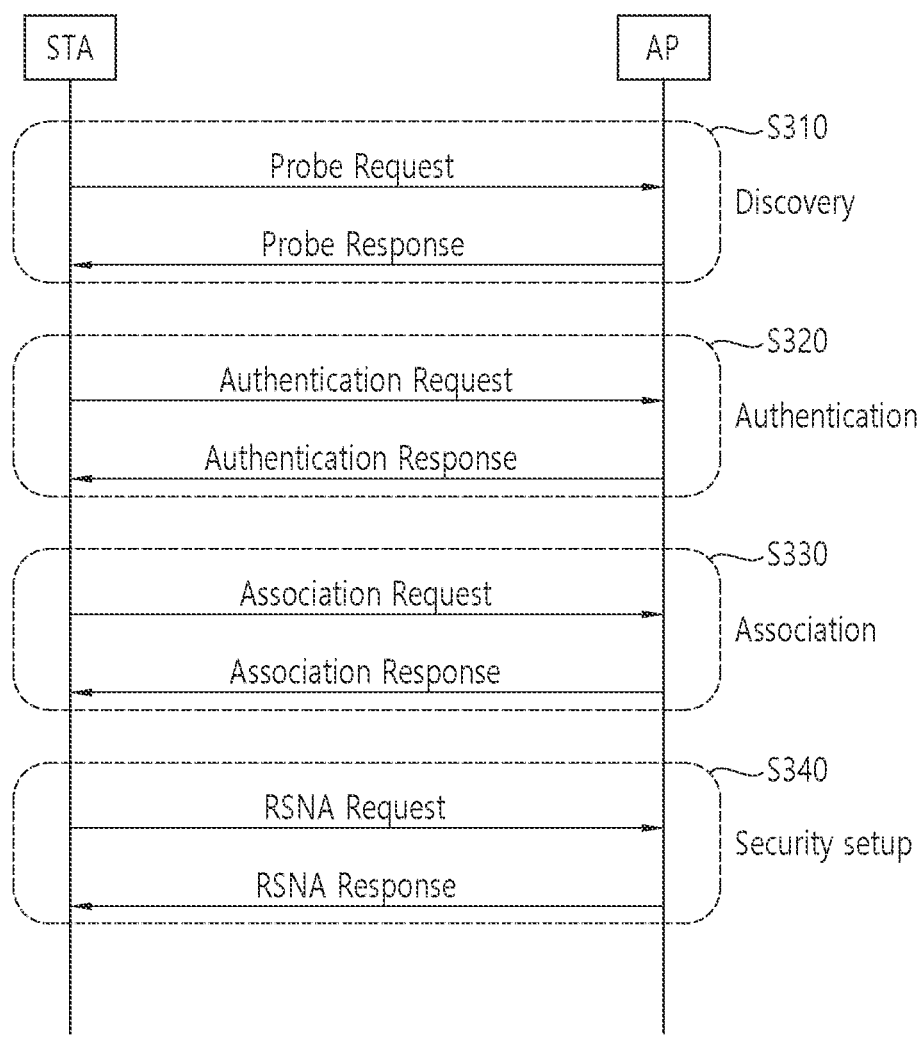
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Hereinafter, a PPDU transmitted/received in a STA of the present specification will be described.

Figure 4:
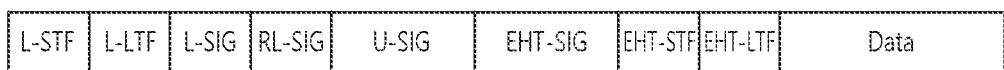
FIG. 4 illustrates an example of a PPDU used in the present specification.

FIG. 4 illustrates an example of a PPDU used in the present specification.

The PPDU of FIG. 4 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 4 may indicate the entirety or part of a PPDU type used in the EHT system. For example, the example of FIG. 4 may be used for both of a single-user (SU) mode and a multi-user (MU) mode. In other words, the PPDU of FIG. 4 may be a PPDU for one receiving STA or a plurality of receiving STAs. When the PPDU of FIG. 4 is used for a trigger-based (TB) mode, the EHT-SIG of FIG. 4 may be omitted. In other words, a STA which has received a trigger frame for uplink-MU (UL-MU) may transmit the PPDU in which the EHT-SIG is omitted in the example of FIG. 4.

In FIG. 4, an L-STF to an EHT-LTF may be called a preamble or a physical preamble, and may be generated/transmitted/received/obtained/decoded in a physical layer.

A subcarrier spacing of the L-STF, L-LTF, L-SIG. RL-SIG, U-SIG, and EHT-SIG fields of FIG. 4 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 4, the L-LTF and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 4. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU.

For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 6, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 4. The PPDU of FIG. 4 may be used to transmit/receive frames of various types. For example, the PPDU of FIG. 4 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 4 may be used for a management frame. An example of the management frame may include a beacon frame, a (re-)association request frame, a (re-)association response frame, a probe request frame, and a probe response frame. For example, the PPDU of FIG. 4 may be used for a data frame. For example, the PPDU of FIG. 4 may be used to simultaneously transmit at least two or more of the control frame, the management frame, and the data frame.

Figure 5:
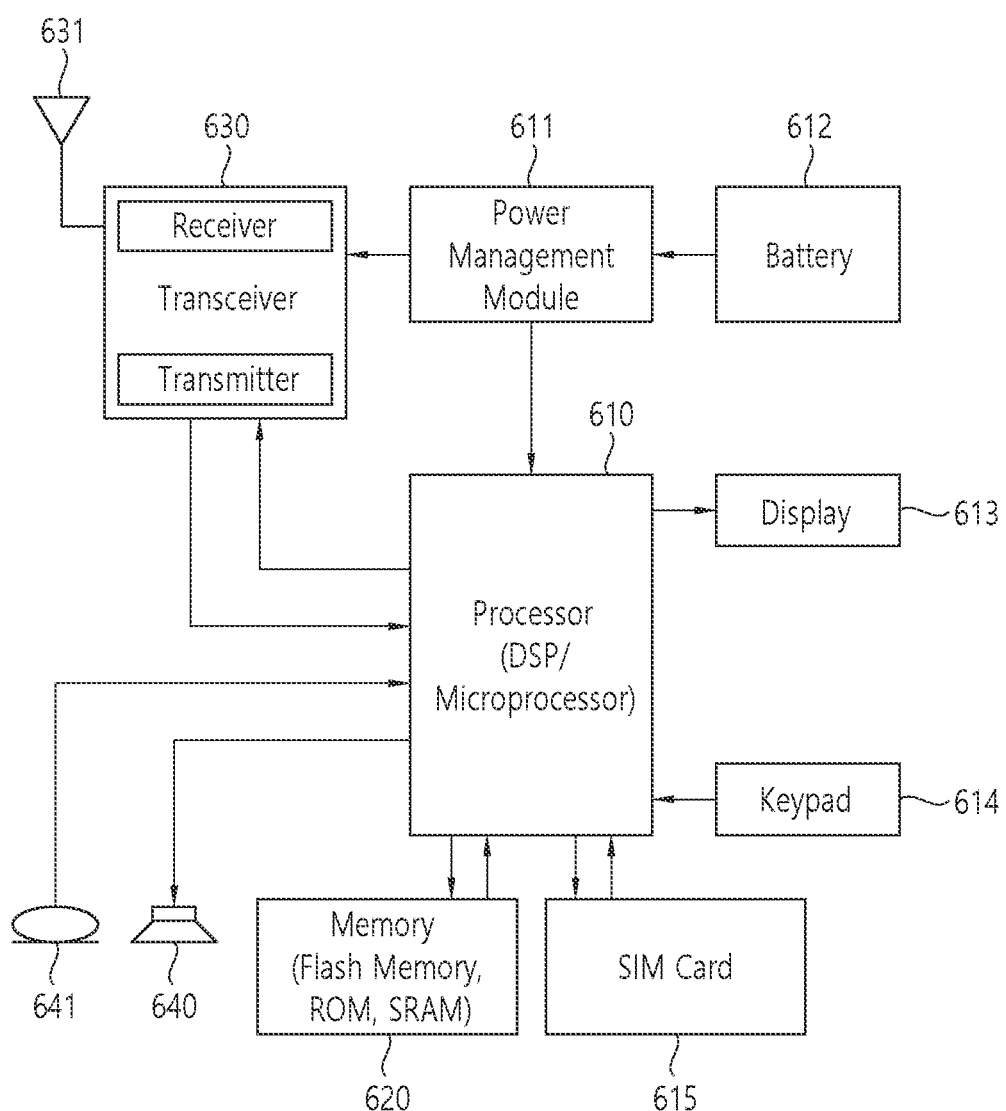
FIG. 5 illustrates an example of a modified transmission device and/or receiving device of the present specification.

FIG. 5 illustrates an example of a modified transmission device and/or receiving device of the present specification.

Each device/STA of the sub-figure (a)/(b) of FIG. 1 may be modified as shown in FIG. 5. A transceiver 630 of FIG. 5 may be identical to the transceivers 113 and 123 of FIG. 1. The transceiver 630 of FIG. 5 may include a receiver and a transmitter.

A processor 610 of FIG. 5 may be identical to the processors 111 and 121 of FIG. 1. Alternatively, the processor 610 of FIG. 5 may be identical to the processing chips 114 and 124 of FIG. 1.

A memory 620 of FIG. 5 may be identical to the memories 112 and 122 of FIG. 1. Alternatively, the memory 620 of FIG. 5 may be a separate external memory different from the memories 112 and 122 of FIG. 1.

Referring to FIG. 5, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 5, a speaker 640 may output a result related to a sound processed by the processor 610. A microphone 641 may receive an input related to a sound to be used by the processor 610.

Hereinafter, technical features for multi-link (ML) supported by the STA of the present specification will be described.

A STA (AP and/or non-AP STA) of the present specification may support ML communication. ML communication may mean communication supporting a plurality of links. Links related to ML communication may include at least one channel of a 2.4 GHz band, a 5 GHz band, and a 6 GHz band (e.g. 20/40/80/160/240/320 MHz channels).

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown, the 5 GHz band, and the 6 GHz band (for example, 20/40/80/160/240/320 MHz channels).

A plurality of links used for ML communication may be configured in various ways. For example, a plurality of links supported by one STA for ML communication may include a plurality of channels in a 2.4 GHz band, a plurality of channels in a 5 GHz band, and/or a plurality of channels in a 6 GHz band. Alternatively, a plurality of links supported by one STA for ML communication includes a combination of at least one channel in the 2.4 GHz band (or 5 GHz/6 GHz band) and at least one channel in the 5 GHz band (or 2.4 GHz/6 GHz band). Meanwhile, at least one of a plurality of links supported by one STA for ML communication may be a channel to which preamble puncturing is applied.

A STA may perform ML setup to perform ML communication. ML setup may be performed based on a management frame such as Beacon. Probe Request/Response, Association Request/Response or a control frame. For example, information related to ML configuration may be included in an element field included in Beacon, Probe Request/Response, and Association Request/Response.

When ML setup is completed, an enabled link for ML communication may be determined. The STA may perform frame exchange through at least one of a plurality of links determined as an enabled link. For example, the enabled link may be used for at least one of a management frame, a control frame and a data frame.

When one STA supports a plurality of links, a transceiver supporting each link may operate as one logical STA. For example, one STA supporting two links may be expressed as one multi-link device (MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to ML setup are described.

The MLD (AP MLD and/or non-AP MLD) may transmit information related to a link that the corresponding MLD can support through ML setup. Link information may be configured in various ways. For example, information about the link includes at least one of 1) information on whether the MLD (or STA) supports simultaneous RX/TX operation, 2) information about the number/upper limit of uplink/downlink links supported by the MLD (or STA), 3) information about the location/band/resource of the uplink/downlink link supported by the MLD (or STA), 4) information about the type (management, control, data etc.) of frame available or preferred in at least one uplink/downlink link, 5) information about available or preferred ACK policy in at least one uplink/downlink link, and/or 6) information about available or preferred TID (traffic identifier) in at least one uplink/downlink link. The TID is related to the priority of traffic data and is expressed as eight types of values according to the conventional WLAN standard. That is, eight TID values corresponding to four access categories (ACs) (AC_BK (background), AC_BE (best effort), AC_VI (video), and AC_VO (voice)) according to the conventional WLAN standard can be defined.

For example, it may be configured in advance that all TIDs for uplink/downlink link are mapped. Specifically, if negotiation is not made through ML setup, all TIDs are used for ML communication. If mapping between uplink/downlink link and TID is negotiated through additional ML setup, the negotiated TID is used for ML communication.

A plurality of links that can be used by the transmitting MLD and the receiving MLD related to ML communication may be configured through ML setup, and this may be referred to as an "enabled link". The "enabled link" may be called differently in various expressions. For example, it may be referred to as various expressions such as a first link, a second link, a transmission link, and a reception link.

After the ML setup is completed, the MLD may update the ML setup. For example, the MLD may transmit information about a new link when it is necessary to update information about the link. Information related to the new link may be transmitted based on at least one of a management frame, a control frame, and a data frame.

In extreme high throughput (EHT), a standard being discussed after IEEE802.11ax, the introduction of HARQ is being considered. When HARQ is introduced, coverage can be widened in a low signal-to-noise ratio (SNR) environment, that is, an environment where the distance between the transmitting terminal and the receiving terminal is long, and a higher throughput may be obtained in a high SNR environment.

The device described below may be the apparatus of FIGS. 1 and/or 10, and the PPDU may be the PPDU of FIG. 9. The device may be an AP or a non-AP STA. The device described below may be an AP multi-link device (MLD) supporting multi-link or a non-AP STA MLD.

Figure 21:
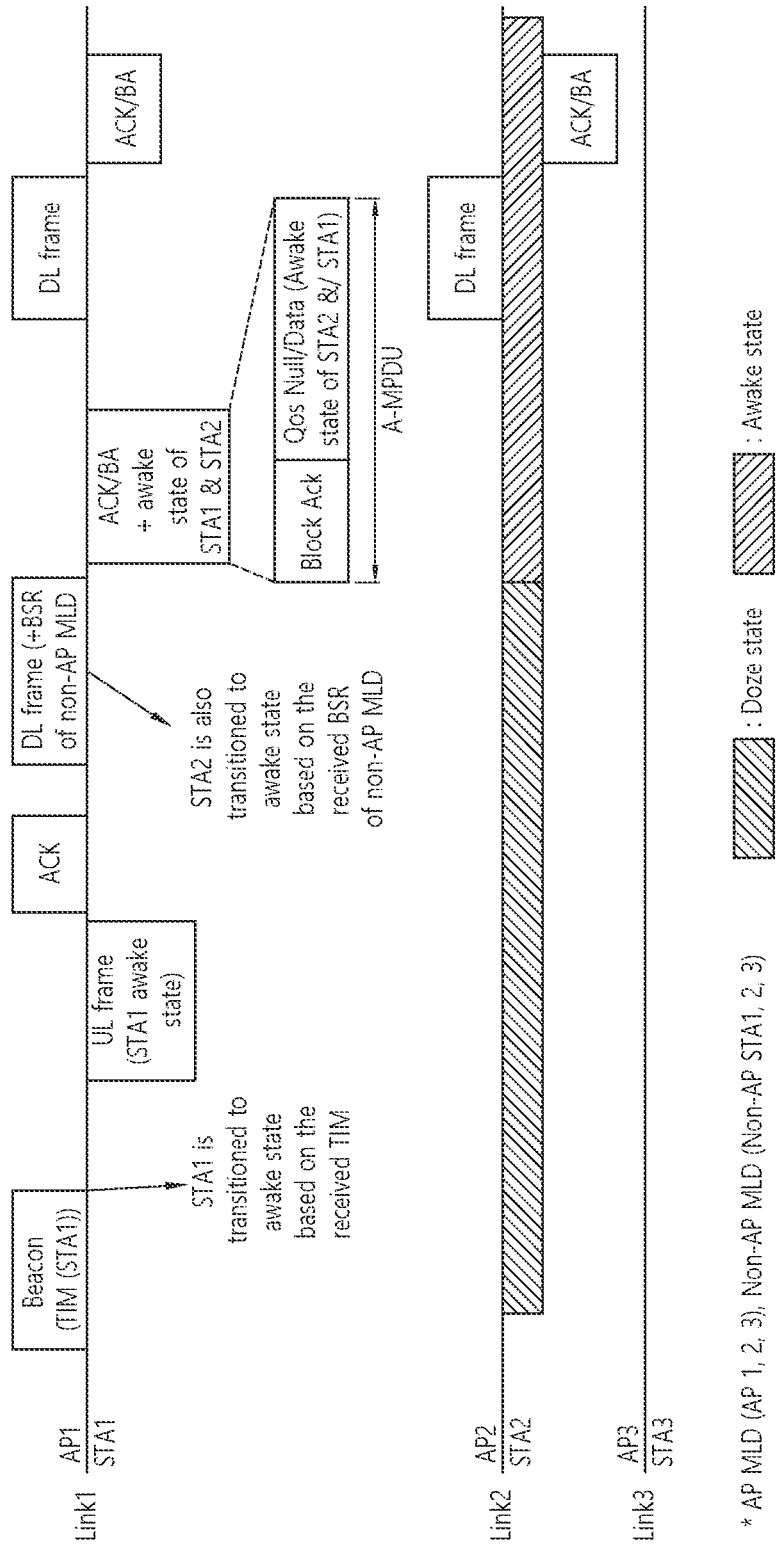
FIG. 21 is a diagram illustrating an embodiment of a power state transmission method according to method 1).

In extremely high throughput (EHT), a standard being discussed after 802.11ax, a multi-link environment using one or more bands at the same time is being considered. When the device supports multi-link or multi-link, the device may use one or more bands (e.g., 2.4 GHz, 5 GHz, 6 GHz, 60 GHz, etc.) simultaneously or alternately. Multi-link transmission can be classified into two types as shown in FIG. 21.

Hereinafter, although described in the form of a multi-link, the frequency band may be configured in various other forms. Although terms such as multi-band and/or multi-link may be used in this specification, the following embodiments may be described based on multi-link for convenience of description below.

In the following specification, MLD refers to a multi-link device. The MLD has one or more affiliated STAs and has one MAC service access point (SAP) that connects to an upper link layer (Logical Link Control, LLC). The MLD may mean a physical device or a logical device. Hereinafter, a device may mean the MLD.

In the following specification, a transmitting device and a receiving device may refer to the MLD. The first link of the receiving/transmitting device may be a terminal (e.g., STA or AP) that performs signal transmission/reception through the first link included in the receiving/transmitting device. The second link of the receiving/transmitting device may be a terminal (e.g., STA or AP) that performs signal transmission/reception through the second link included in the receiving/transmitting device.

IEEE802.11be can support two types of multi-link operations. For example, simultaneous transmit and receive (STR) and non-STR operations may be considered. For example, an STR may be referred to as an asynchronous multi-link operation, and a non-STR may be referred to as a synchronous multi-link operation. The multi-link may include a multi-band. That is, the multi-link may mean a link included in several frequency bands, or may mean a plurality of links included in one frequency band.

EHT (11be) may consider multi-link technology, where multi-link may include multi-band. That is, the multi-link may represent links of several bands and at the same time may represent several multi-links within one band. Two types of multi-link operations are being considered. A capability enabling simultaneous reception and transmission on multiple links may be referred to as simultaneous transmit and receive (STR). Links having STR capability can be said to be in an STR relationship. Links that do not have STR capability can be said to be in a non-STR relationship.

Figure 6:
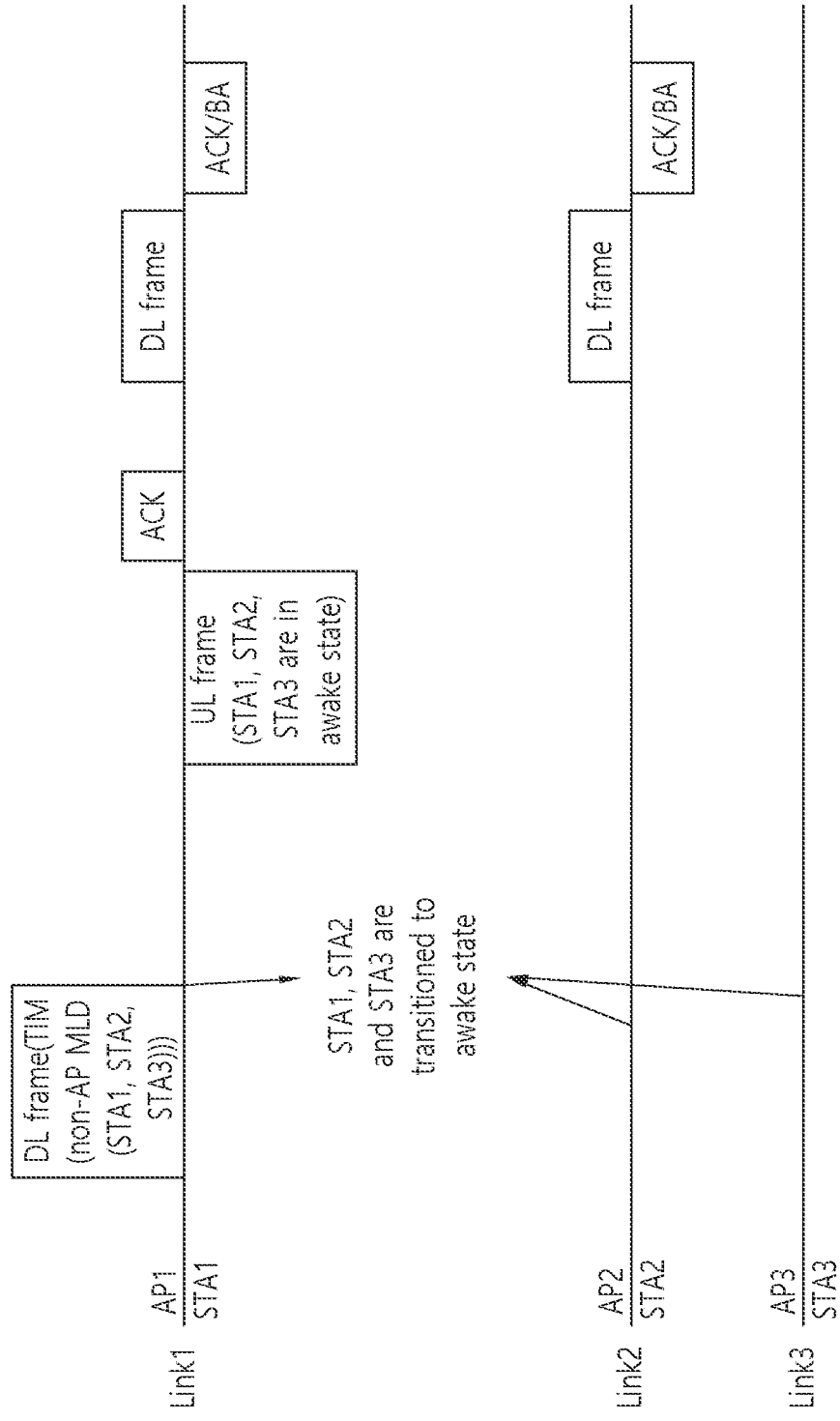
FIG. 6 to FIG. 10 are diagrams illustrating an embodiment of a wakeup operation.

FIG. 6 illustrates an embodiment of a wakeup operation.

Referring to FIG. 6, APs 1, 2, and 3 may be present in an AP MLD, and STAs 1, 2, and 3 may be present in a non-AP MLD. The STAs 1, 2, and 3 are associated respectively with the APs 1, 2, and 3. Upon receiving traffic corresponding to a TID mapped to the STAs 1, 2, and 3 (i.e., links 1, 2, and 3), the AP MLD may indicate that buffer traffic is present in the STAs 1, 2, and 3. That is, even if corresponding buffer traffic is present in the STAs 1, 2, and 3, the AP (or AP MLD) may transmit a traffic indication to corresponding STAs in order to awaken some of the three STAs. The STAs 1, 2, and 3 of the non-AP MLD transition to the awake state, and when transmitting a UL frame, may inform the AP MLD (or AP) that the STAs 1, 2, and 3 are awakened. The AP may transmit a DL frame to two STAs (STA1, STA2) among them. Although the STA1 informs the AP1 of the awake state of the STAs 1, 2, and 3 in FIG. 6, it is obvious that each STA can inform each associated AP of the awake state thereof through a link thereof. For example, the STA1 may inform the AP1 of the awake state of the STA1 through a link1, the STA2 may inform the AP2 of the awake state of the STA2 through a link2, and the STA3 may inform the AP3 of the awake state of the STA3 through a link3. Descriptions thereof may be equally applied throughout the present specification.

Method 1: An AP MLD (or AP) provides a non-AP MLD (or non-AP STA) with at least one of a buffer status report for a corresponding non-AP MLD, a buffer status report for each STA in the non-AP MLD, and a buffer status report per TID in each STA of the non-AP MLD Buffer status report information of a terminal (e.g., non-AP MLD) to which the AP transfers buffer information may include at least one piece of information described below.

1) The total amount of the entire buffered traffic for the non-AP MLD (i.e., Queue size all of the non-AP MLD)

2) The total amount of buffered traffic for each STA in the non-AP MLD (i.e., Queue size all of each non-AP STA): that is, sum information of all queues for respective STAs 3) The amount of per-AC (access category, e.g., AC_VI, AC_VO, AC_BE, AC_BK) buffered traffic in each non-AP STA: that is, queue information corresponding to each AC is included in each STA 4) The amount of per-TID buffered traffic in each non-AP STA: that is, queue information corresponding to each TID is included in each STA 5) Report the amount of buffered traffic by distinguishing the received buffered traffic for STAs in the non-AP MLD according to an AC: that is, per-AC queue size information for a corresponding non-AP MLD is included 6) Report the amount of buffered traffic by distinguishing the received buffered traffic for STAs in the non-AP MLD according to a TID: that is, per-TID queue size (buffered traffic amount) information for a corresponding non-AP MLD is included In addition, buffer information to be transmitted by the AP MLD may include at least one piece of information (e.g., ACI Bitmap, Delta TID, ACI High, Scaling Factor, Queue Size High, Queue Size All, etc.) included in the existing buffer status report (BSR) control field.

Although the amount of the entire buffer traffic of the non-AP MLD is reported in the description of the present specification, it is obvious that one or more pieces of information listed above may be included in buffer status information for the non-AP MLD, transmitted by the AP.

When the non-AP MLD receives BSR information (i.e., at least one of BSR information of the aforementioned non-AP MLD, BSR information for each of STAs in the non-AP MLD, per-AC queue size information in each non-AP STA of the non-AP MLD, per-TID BSR information in each non-AP STA in the non-AP MLD, per-AC BSR information in the non-AP MLD, per-TID BSR information in the non-AP MLD) corresponding to the non-AP MLD from the AP MLD, the non-AP MLD may determine how many links (i.e., STAs mapped to the links) will be awakened based on the information. The non-AP MLD (or non-AP STA) may report to an associated AP MLD (or AP) about which STAs (or links corresponding to the STAs) have been awakened. The AP MLD (or AP) may transmit a DL frame through a corresponding link, based on information transmitted by a terminal (information on which non-AP STA in the non-AP has been awakened).

Figure 7:
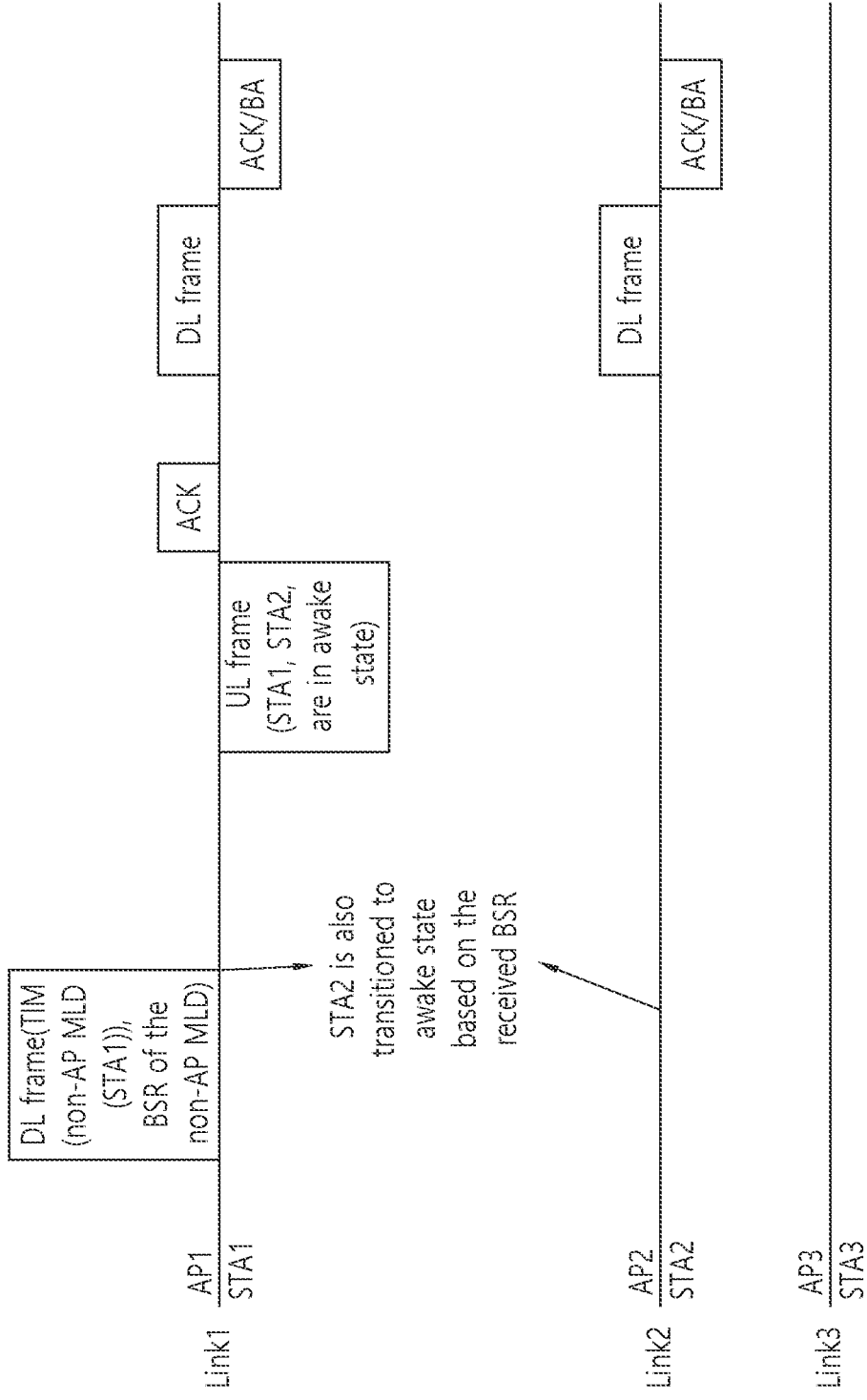

FIG. 7 illustrates an embodiment of a wakeup operation.

Referring to FIG. 7, APs 1, 2, and 3 may be present in an AP MLD, and STAs 1, 2, and 3 may be present in a non-AP MLD. The STAs 1, 2, and 3 of the non-AP are associated respectively with the APs 1, 2, and 3.

When transmitting a DL frame to the STA1 through a link1, the AP MLD (or AP1) may transmit to the STA1 (or a non-AP MLD of the STA1) a BSR (queue size or buffered traffic size) of the non-AP MLD together with an indication indicating a presence of buffered traffic. After the STA1 (or non-AP MLD) receives BSR information from the AP, the STA2 (i.e., link2) may be awakened, and if transmission is performed by including information indicating that the STA1 and the STA2 have been awakened (i.e., information indicating that it is ready to receive the DL frame) when transmitting a UL frame to the AP (e.g., AP MLD), the AP (e.g., AP MLD) may transmit the DL frame to the STA1 and the STA2 through the link1 and the link2. The DL frame including the indication indicating the presence of the buffered traffic is preferably a beacon frame in the present specification, but is not limited thereto. Instead of transmitting to the STA1 a buffered traffic indication for the STA1, only a buffered traffic indication for the non-AP MLD of the STA1 may be included in a TIM, and a specific STA or the specific link may not be indicated. This may be equally applied throughout the present specification.

Detailed transmission method: The AP MLD (or AP STA) performs transmission by including the buffer status report information defined above for the non-AP MLD (or non-AP STA) together in a corresponding frame (e.g., a DL data frame) when transmitting an individually address (e.g., unicast) frame to a terminal in an awake state. The non-AP MLD (or non-AP STA) uses the buffer status report information included in the DL frame to determine whether to transition some links (or STAs corresponding to the links) to the awake state among multiple links, and transmits an uplink frame including information on the awake links/STAs to the AP to report this.

Figure 8:
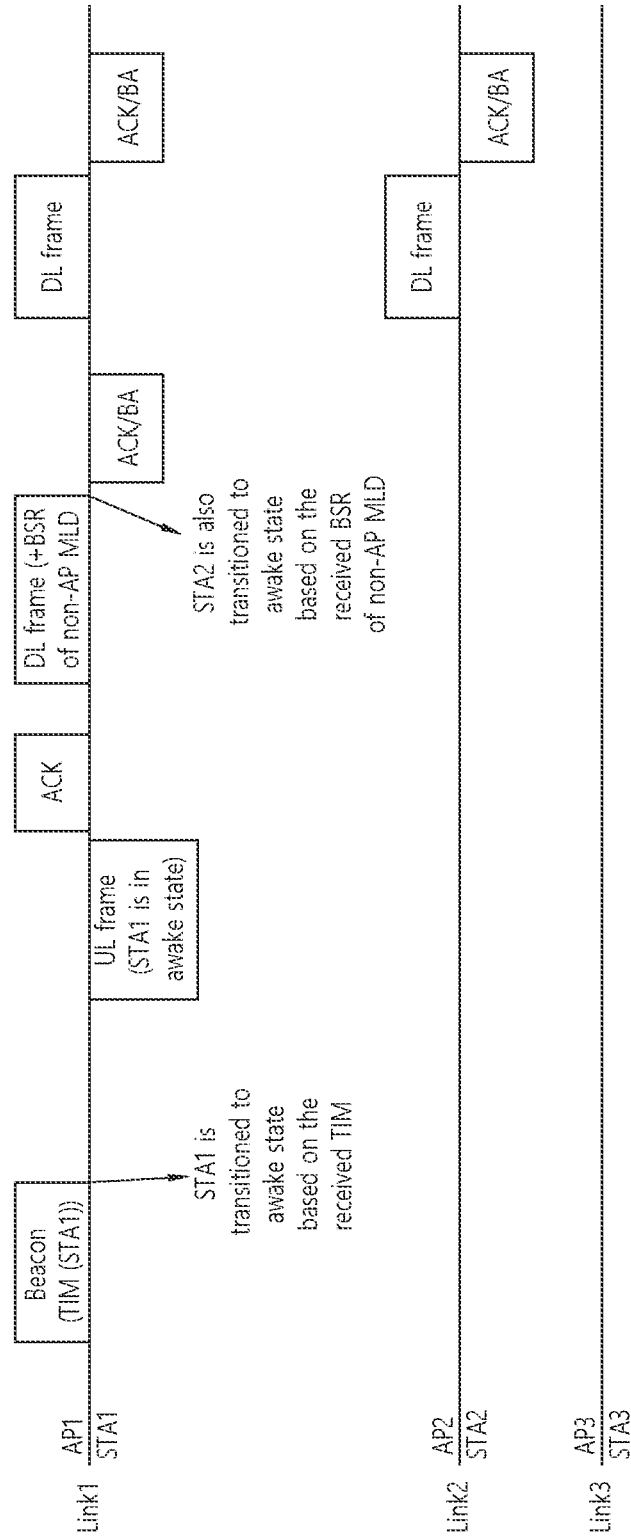

FIG. 8 illustrates an embodiment of a wakeup operation.

Referring to FIG. 8, APs 1, 2, and 3 are present in an AP MLD, and STAs 1, 2, and 3 are present in a non-AP MLD. The STAs 1, 2, and 3 are associated respectively with the APs 1, 2, and 3. It is assumed that all TID(s) for the non-AP MLD are mapped to available links through default TID-to-link mapping.

For example, when the AP1 transmits a beacon through the link1, buffered traffic information for other links/other STAs may be transmitted. Since TIDs are mapped to all available links, the AP MLD may transmit a beacon frame including a TIM for awakening only a corresponding STA (e.g., STA1). Even if information for awakening only the STA1 is contained in the TIM, and even if the TIDs are mapped to all links, the non-AP MLD (or STA1) transitions the STA1 to the awake state. Thereafter, the STA1 may transmit to the AP a UL frame (e.g., PS-poll or QoS null) for reporting that the STA1 is awakened, and may receive an Ack frame in response thereto. When the AP1 transmits a DL frame to the STA1, buffer status information (e.g., BSR or queue size) for a non-AP MLD corresponding to the STA1 may be included and transmitted. When the STA1 receives the DL frame, how many available links thereof will be awakened may be determined upon receiving BSR information for the non-AP MLD. Although only the BSR information for the non-AP MLD is mentioned to describe embodiments of the present specification, it may be replaced with including one or more of various types of BSRs (e.g., BSR information for each STA in the non-AP MLD, or BSR information for each of ACs (or TIDs) of the non-AP MLD). FIG. 8 illustrates an example of transitioning the STA2 for the link2 from the doze state to the awake state. This example shows that the STA1 receives a DL frame and then transmits ACK/BA to the AP1 in response thereto. A subsequent operation of the STA (non-AP MLD) and the AP (/AP MLD) may perform one or more of the following operations.

1) The AP1 (or AP MLD) which has received a response frame (ACK/BA) for DL frame transmission including BSR for the non-AP MLD may transmit a DL frame also through another link (link 2). However, there is a problem in that whether the STA2 is awakened cannot be guaranteed.

2) When the non-AP STA (STA1) receives the BSR for the non-AP MLD, links to be awakened (or STAs to be mapped to the links) are determined based on BSR information, and information of the awakened STA is included and transmitted when a UL frame is transmitted. The AP may transmit a DL frame through multiple links, based on information of an awakened terminal, included in the UL frame.

Figure 9:
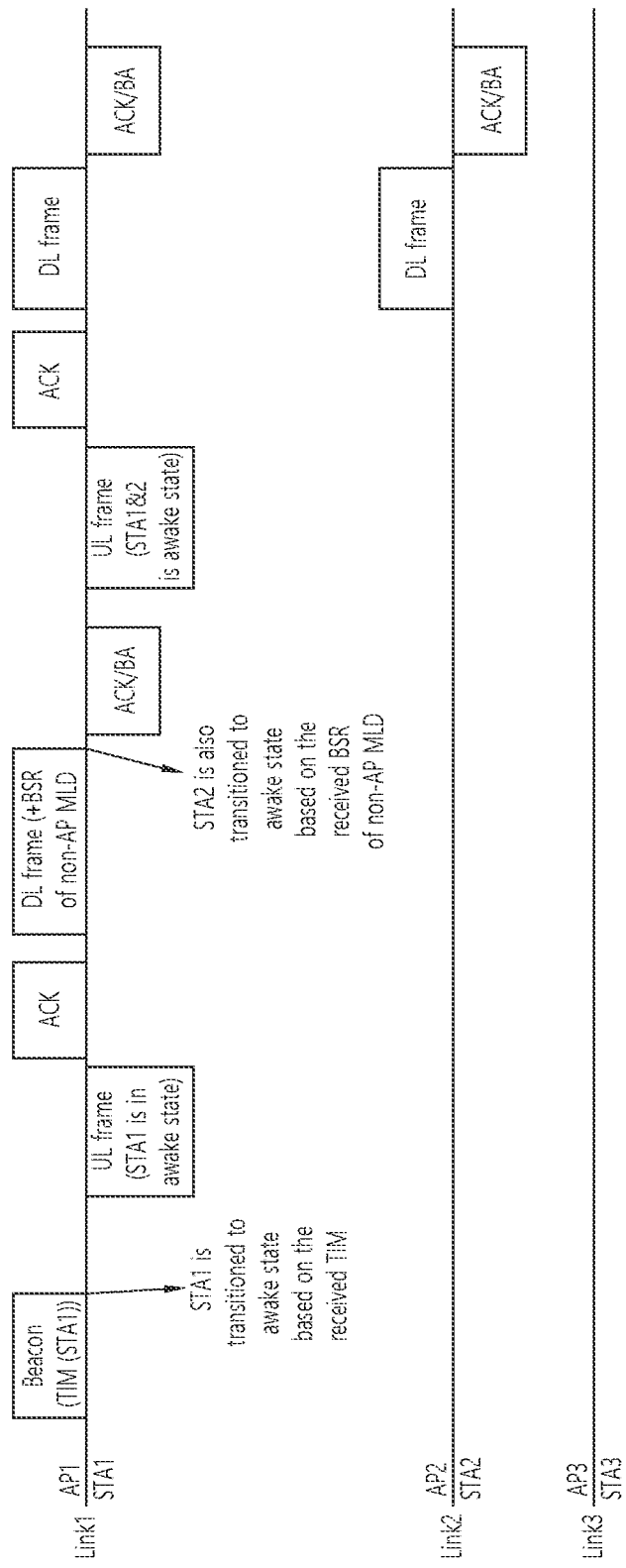

FIG. 9 illustrates an embodiment of a wakeup operation.

Referring to FIG. 9, APs 1, 2, and 3 are present in an AP MLD, and STAs 1, 2, and 3 are present in a non-AP MLD. The STAs 1, 2, and 3 are respectively associated with the APs 1, 2, and 3.

The STA1 may determine to additionally transition the STA2 (link2) to an awake state, based on BSR information for the non-AP MLD included in a first DL frame. After the STA2 is awakened, in order to report that the STA2 is awakened, information thereon is transmitted by being included in a UL frame when the STA1 transmits the UL frame. Thereafter, the AP MLD may transmit the DL frame to the non-AP MLD by using the link 1 and the link 2.

Instead of reporting by the STA1 to the AP MLD (or AP1) that "the STA2 has transitioned to the awake state", the STA2 may report through the link 2 that the STA2 has transitioned to the awake state. An example thereof is described below with reference to FIG. 10.

Figure 10:
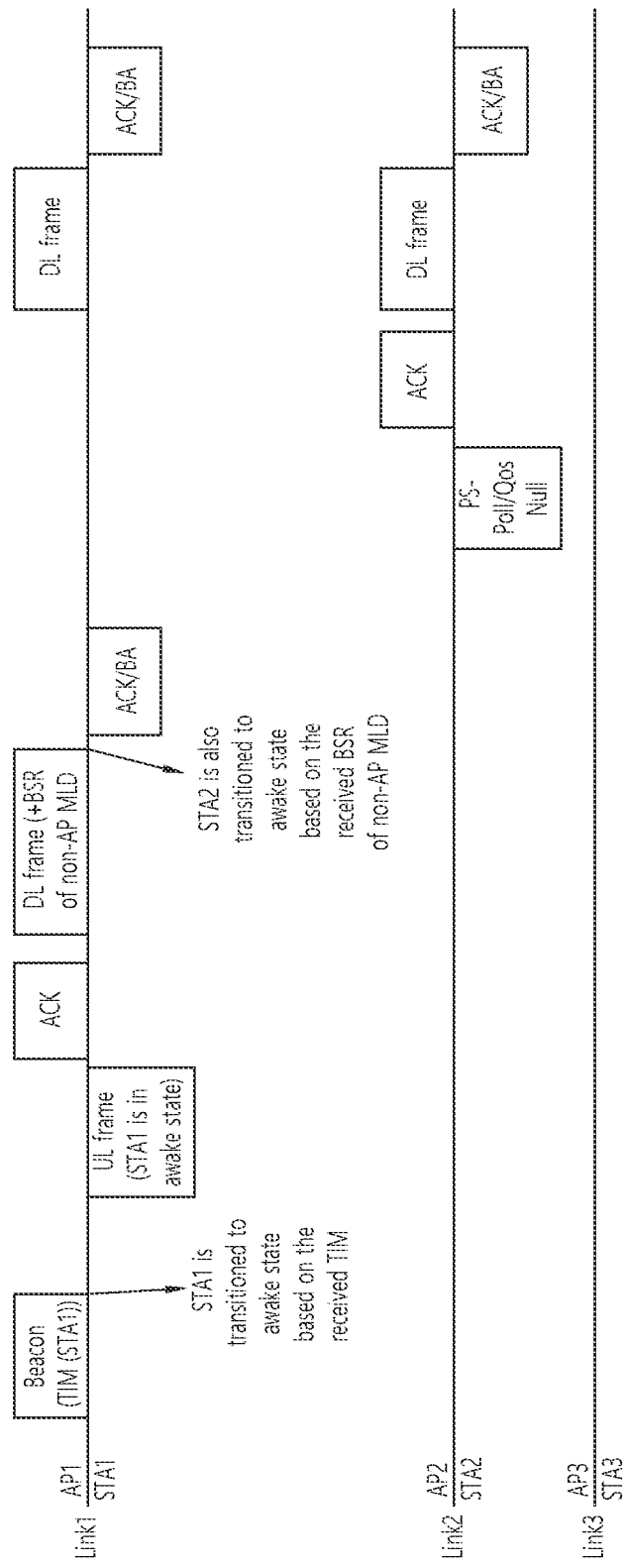

FIG. 10 illustrates an embodiment of a wakeup operation.

Referring to FIG. 10, APs 1, 2, and 3 are present in an AP MLD, and STAs 1, 2, and 3 are present in a non-AP MLD. The STAs 1, 2, and 3 are respectively associated with the APs 1, 2, and 3.

The STA1 (or non-AP MLD) may determine to additionally transition the STA2 (link2) to an awake state, based on BSR information for the non-AP MLD included in a first DL frame. After the STA2 is awakened, in order to report that the STA2 is awakened, the STA2 may transmit a UL frame through the link2. The AP MLD which has received the UL frame (e.g., PS-poll/QoS null frame) from the STA2 through the link2 may know that the STA2 has been awakened, and may transmit the DL frame to the non-AP MLD by using the link1 and the link 2.

A method of transmitting information (e.g., BSR information) related to data to be transmitted by the AP MLD to the STA MLD may be roughly classified into two types as follows.

1. A method in which the information (e.g., BSR information) related to the data to be transmitted by the AP MLD to the STA MLD is included in a beacon frame (the method of FIG. 6 to FIG. 17).

2. A method in which only a TIM related to data to be transmitted by the AP MLD to the STA MLD is transmitted through a beacon frame, and the information (e.g., BSR information) related to the data to be transmitted by the AP MLD to the STA MLD is transmitted through a subsequent DL frame (e.g., a data frame) (the method of FIG. 8 to FIG. 10)

The AP MLD may use both of the two methods. For example, the AP MLD may determine how to transmit BSR information to the STA MLD according to a type of traffic, i.e., AC (or TID). For example, the AP MLD may transmit the BSR information to the STA MLD through the first method (or second method) upon receiving traffic of an AC requiring low latency, and may transmit the BSR information to the STA MLD through the second (or first method) upon receiving traffic of an AC not requiring relatively low latency.

Herein, the AC requiring low latency may be a new AC defined additionally for low-latency transmission, or may be traffic requiring relatively low latency among the existing ACs such as AC_VO, AC_VI, or the like. The AC requiring low latency may vary depending on a situation, and is not limited thereto.

The BSR information of the non-AP MLD, included in the DL frame, may be configured using the following methods.

For example, the BSR information of the non-AP MLD may be included in an HT control field.

FIG. 11 illustrates an embodiment of an HT control field.

Referring to FIG. 11, when BO and BI of the HT control field are both set to 1 so as to be an HE variable HT control field, the remaining bits may be constructed of an A-Control subfield.

Figure 12:
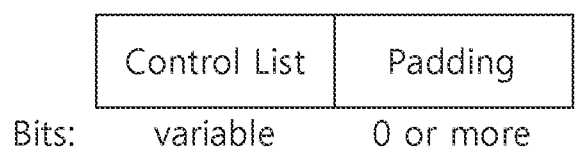
FIG. 12 is a diagram showing an embodiment of an A-Control subfield.

FIG. 12 illustrates an embodiment of an A-Control subfield.

Referring to FIG. 12, the A-Control subfield may have a length of 30 bits, and a control list subfield may include one or more control subfields.

Figure 13:
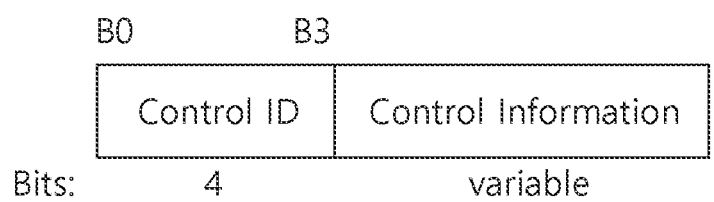
FIG. 13 is a diagram illustrating an embodiment of a Control subfield format.

FIG. 13 illustrates an embodiment of a control subfield format.

Referring to FIG. 13, a control ID subfield indicates a type of information to be transmitted in a control information subfield, and a length of the control information subfield is fixed for each value of the control ID subfield Different control information may be configured according to a value of a control ID.

BSR information of anon-AP MLD may be defined with one new control subfield.

Figure 14:
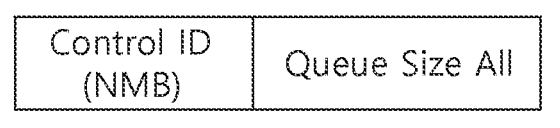

FIG. 14 illustrates an example of a non-AP MLD BSR (NMB) control subfield.

Referring to FIG. 14, a control ID may indicate the NMB, and a queue size may indicate total queue size information of a non-AP MLD to which a corresponding STA (an STA indicated by a receiver address) belongs.

The queue size information may extend an additional queue size by using a scaling factor as shown in FIG. 15.

FIG. 15 illustrates an embodiment of an NMB control subfield.

Referring to FIG. 15 40, a control ID may include at least one of a TID, an STAID, and a link ID. Table 1 shows an example of scaling factor subfield encoding.

TABLE 1

| Scaling Factor subfield | Scaling factor, SF, in octets |
| --- | --- |
| 0 | 16 |
| 1 | 256 |
| 2 | 2048 |
| 3 | 32768 |

Referring to Table 1, the Scaling Factor subfield may indicate the unit (SF), in octets, of the Queue size subfield. In association with an SF value of the Scaling Factor subfield, a Queue size may be used to indicate a total size of all MSDUs and A-MSDUs buffered for a corresponding non-AP MLD by the AP. When a value of the Queue size subfield is A and the Scaling Factor subfield is 1, this indicates that the total size of all MSDUs and A-MSDUs buffered for the non-AP MLD by the AP is about A*256 octets, which may be known to the non-AP MLD (or STA).

The AP-MLD (or AP) may perform transmission by including one or more pieces of information listed below, as well as reporting of the entire buffered information of the non-AP MLD.

ACI(Access Category Indication) information(e.g., 4 bits size): Information indicating an access category (AC) (e.g., AC_VO, AC_VI, AC_BE, AC_BK) of which an BSR is indicated by corresponding BSR information. When it is included in a bitmap format, bits are mapped to respective ACs, and indicate that traffic is present for an AC set to 1.

Figure 16:
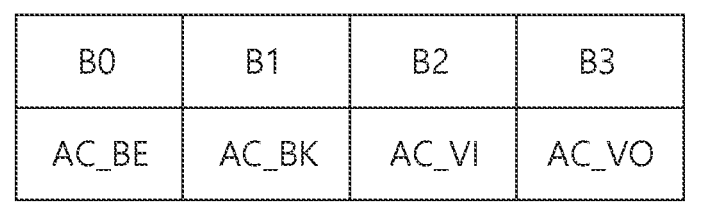

FIG. 16 illustrates an example of ACI bitmap subfield encoding.

Delta TID) (e.g., 2 bits size): indicates the number of TIDs for which a buffer status is reported, together with an ACI bitmap subfield. Table 2 shows an example of delta TID) subfield encoding.

TABLE 2

| Number of bits in the ACI Bitmap subfield that are set to 1 | Mapping of Delta TID subfield value and number of TIDS, $N_{TID}$ |
| --- | --- |
| 0 | Values 0 to 2 are not applicable; Value 3 indicates 8 TIDs (i.e., all ACs have traffic) |
| 1 | Value 0 indicates 1 TID: Value 1 indicates 2 TIDs; Values 2 to 3 are not applicable; |
| 2 | Value 0 indicates 2 TID; Value 1 indicates 3 TIDs: Value 2 indicates 4 TIDs; Value 3 is not applicable; |
| 3 | Value 0 indicates 3 TID: Value 1 indicates 4 TIDs; Value 2 indicates 5 TIDs: Value 3 indicates 6 TIDs; |
| 4 | Value 0 indicates 4 TID; Value 1 indicates 5 TIDs; Value 2 indicates 6 TIDs; Value 3 indicates 7 TIDs; |

NOTE 1-
The number of TIDs can be obtained as $N_{TID} = N_{ones} + D_{Val}$, where $N_{ones}$ is the number of bits set to one in the AC Bitmap subfield, and $D_{Val}$ is the value of the Delta TID subfield except if $N_{ones}$ is equal to 0 for which there is the $N_{TID} = 8$ case.
NOTE 2-
The Delta TID might be used by an AP to determine the setting of the TID Aggregation Limit field in the User Info field addressed to the STA in a subsequent Basic Trigger frame.

ACI High subfield (e.g., 2 bits size): used together with a queue size high subfield, and indicates ACI of an AC for which a BSR is indicated in a queue size high subfield. An example of ACI to AC coding is shown in the table below.

Queue Size High subfield (e.g., 8 bits size): indicates an amount of buffered traffic for an AC indicated by the ACT High subfield, by using an SF unit.

The Queue Size All subfield: indicates an amount of buffered traffic for all ACs indicated by the ACI Bitmap subfield, in units of SF octets of the Scaling Factor subfield.

In addition, a value of 254 in the Queue Size High and Queue Size All subfields indicates that the amount of buffered traffic is greater than 254×SF octets, and a value of 255 in the Queue Size High and Queue Size All subfields indicates that the amount of buffered traffic is an unspecified or unknown.

FIG. 17 illustrates an example of an NMB control subfield including every information described above.

As described above, a value indicated by a scaling factor is applied to both Queue Size High and Queue Size All. ACI Bitmap and Delta TID values are applied to Queue Size All. ACI High is applied to Queue Size High.

It is exemplified that an AP (or AP MLD) newly defines and uses a control subfield to report a BSR of a specific non-AP MLD. Hereinafter, a method of using the existing BSR control subfield is described.

FIG. 18 illustrates an example of a BSR control subfield in an 11ax system.

Referring to FIG. 18, the BSR control subfield is an HT control field used when a terminal transmits a buffer status thereof to an AP. For a simple definition in the present specification, when an AP MLD transfers to a corresponding non-AP STA an amount of buffered traffic for a specific non-AP MLD in a BSR thereof, the existing BSR control subfield may be used. However, to use this, the BSR transmitted by the AP needs to be redefined to indicate not a buffer status of a specific non-AP STA (i.e., an STA indicated by a receiver address of a frame including the BSR control field) but an amount of traffic to be transmitted to a non-AP MLD to which the non-AP STA belongs. In this case, there may be a constraint in that the BSR information for the specific non-AP STA cannot be transferred.

That is, when the AP transmits the BSR control field, information included in the BSR control field indicates BSR information of an MLD to which the STA indicated by the receiver address of the frame including the BSR control field belongs.

If an address is set to a broadcast address, the AP indicates TID count information and AC information related to queue size information for high AC and a total buffered traffic amount of the AP.

The information defined above may be transmitted by being defined in different formats described below.

1) The amount of per-AC (access category, e.g., AC_VI, AC_VO, AC_BE, AC_BK) buffered traffic in each non-AP STA: that is, queue information corresponding to each AC is included in each STA 2) The amount of per-TID buffered traffic in each non-AP STA: that is, queue information corresponding to each TID is included in each STA 3) Report the amount of buffered traffic by distinguishing the received buffered traffic for STAs in the non-AP MLD according to an AC: that is, per-AC queue size information for a corresponding non-AP MLD is included 4) Report the amount of buffered traffic by distinguishing the received buffered traffic for STAs in the non-AP MLD according to a TID: that is, per-TID queue size (buffered traffic amount) information for a corresponding non-AP MLD is included Hereinafter, a method in which an MLD (e.g., non-AP MLD) transmits information related to the power state (e.g., doze state or awake state) of STAs included in the MLD will be described. For convenience of explanation, a method in which a non-AP MLD receiving buffer information from an AP MLD transmits power state information based on the buffer information is described, but a method in which the MLD transmits power state information is not limited thereto.

Figure 19:
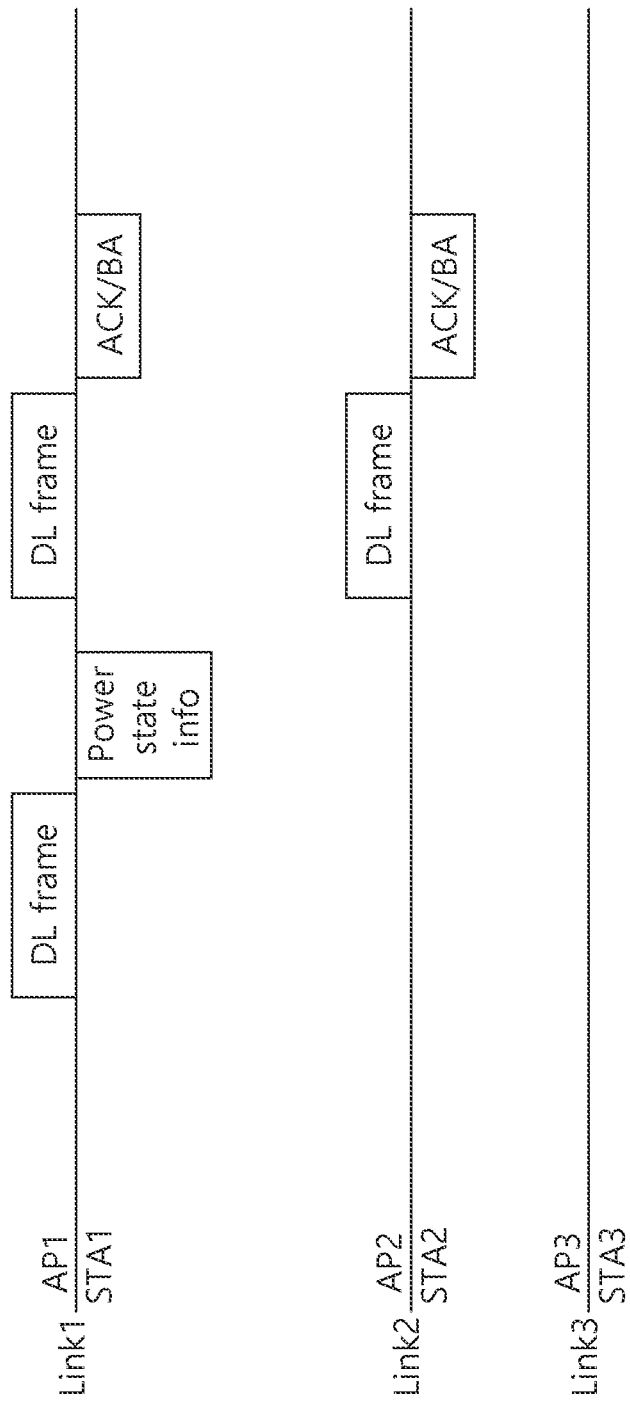
FIG. 19 to FIG. 20 are diagrams illustrating an embodiment of a power state transmission method.

FIG. 19 is a diagram illustrating an embodiment of a power state transmission method.

Referring to FIG. 19, AP1, AP2, and AP3 exist in the AP MLD, and STA1, STA2, and STA3 exist in the Non-AP MLD. The STA1, STA2, and STA3 are associated with the AP1, AP2, and AP3, respectively.

The AP MLD (or AP1) may transmit a DL frame to the STA MLD (or STA1). The DL frame is not limited to a beacon frame or a PPDU including data. When the STA MLD receives a DL frame from the AP MLD, it may transmit power state information of STAs included in the STA MLD. The power state information may include information related to whether STAs included in the STA MLD are in doze state or awake state.

For example, the DL frame may include information requesting power state information of STAs of the STA MLD. In this case, since the STA MLD has received a request for power state information through the DL frame, it may transmit power state information of STAs to the AP MLD.

For example, the DL frame may include buffer information about the amount of data to be transmitted from the AP MLD to the STA MLD. In this case, the STA MLD may determine STAs to be transitioned from doze state to awake state or from awake state to doze state based on the buffer information, and may transmit power state information of the STAs to the AP MLD.

The above embodiments are examples of information that may be included in the DL frame, and the information included in the DL frame is not limited thereto.

Upon receiving power state information from the STA MLD, the AP MLD may transmit data through at least one link (e.g., a first link and a second link) based on the received information.

For example, the non-AP MLD that has received the BSR of the non-AP MLD included in the DL frame determines which STAs to awake, and then transmits the information of the awake STAs by including them in the UL data frame. However, this is because the AP MLD does not know the information of the awake STA of the non-AP MLD until the UL frame is received by the AP MLD, so DL frame transmission may be possible through only one STA.

In order to transmit fast power state transition information, when the non-AP MLD transmits an immediate response frame (e.g., ACK (acknowledgement)/BA (block ACK)) upon receiving a DL frame containing its own BSR information, the non-AP MLD can quickly notify the AP MLD by transmitting power state transition information by including power state transition information in the corresponding frame.

Figure 20:
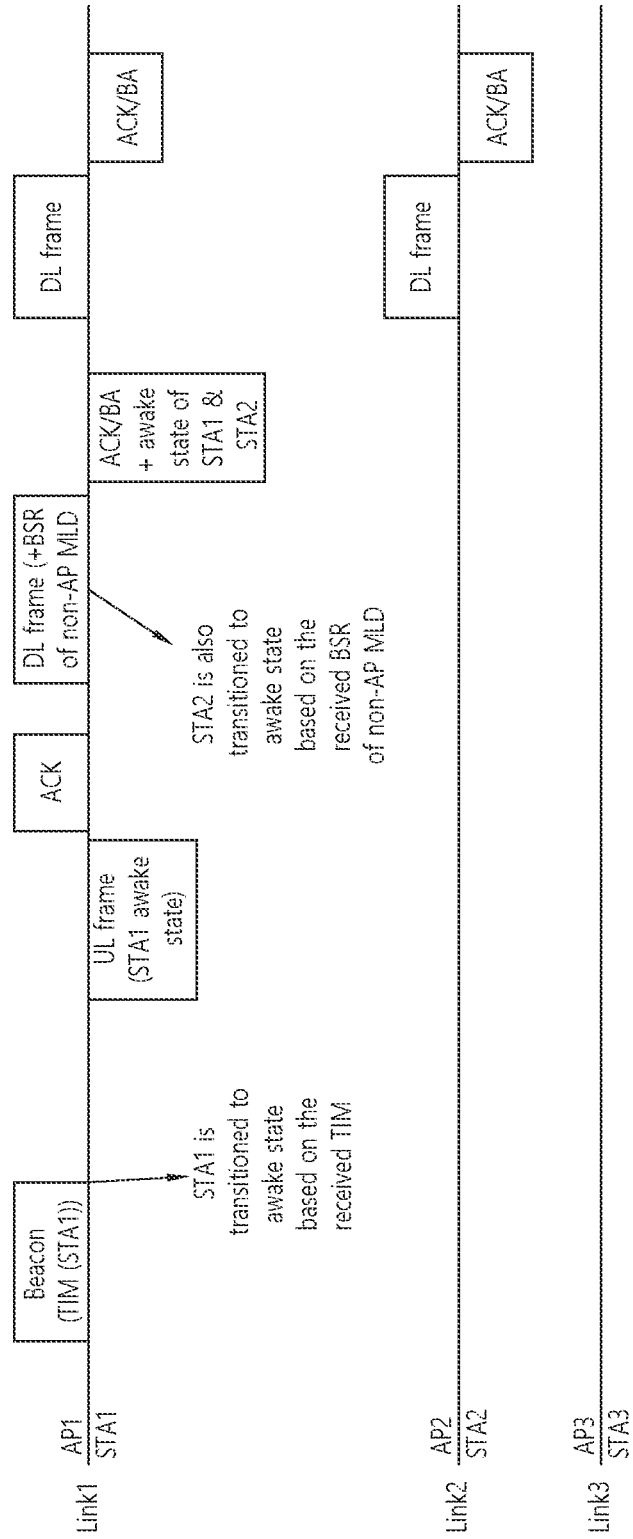

FIG. 20 is a diagram illustrating an embodiment of a power state transmission method.

Referring to FIG. 20, an AP (or AP MLD) may wake up STA1 through TIM. For example, the AP may transmit TIM information to the STA1, and the STA1 may transition to an awake state based on the TIM information. The STA1 may transmit a PS-Poll including information that the STA1 is in an awake state to the AP. When the AP transmits the DL frame after receiving the PS-Poll, it may include BSR information for the non-AP MLD in the DL frame and transmit it. The non-AP MLD of the STA1 may awake STA2 based on the received BSR, and then include and transmit information of the awaked STA when transmitting a response frame (ACK/BA) for the DL frame. A method in which power state information (i.e., information indicating which STA has transitioned to the awake state (or doze state)) is transmitted together with the response frame may be transmitted using one of the following methods.

1) A MAC frame (e.g., QoS data frame or QoS Null frame) including power state transition information (e.g., information indicating which STAs have transitioned to the awake state (or to the doze state)) may be aggregated into a response frame (Ack frame or Block Ack frame) and one A-MPDU and transmitted. FIG. 21 is a diagram illustrating an embodiment of a power state transmission method according to method 1).

Figure 22:
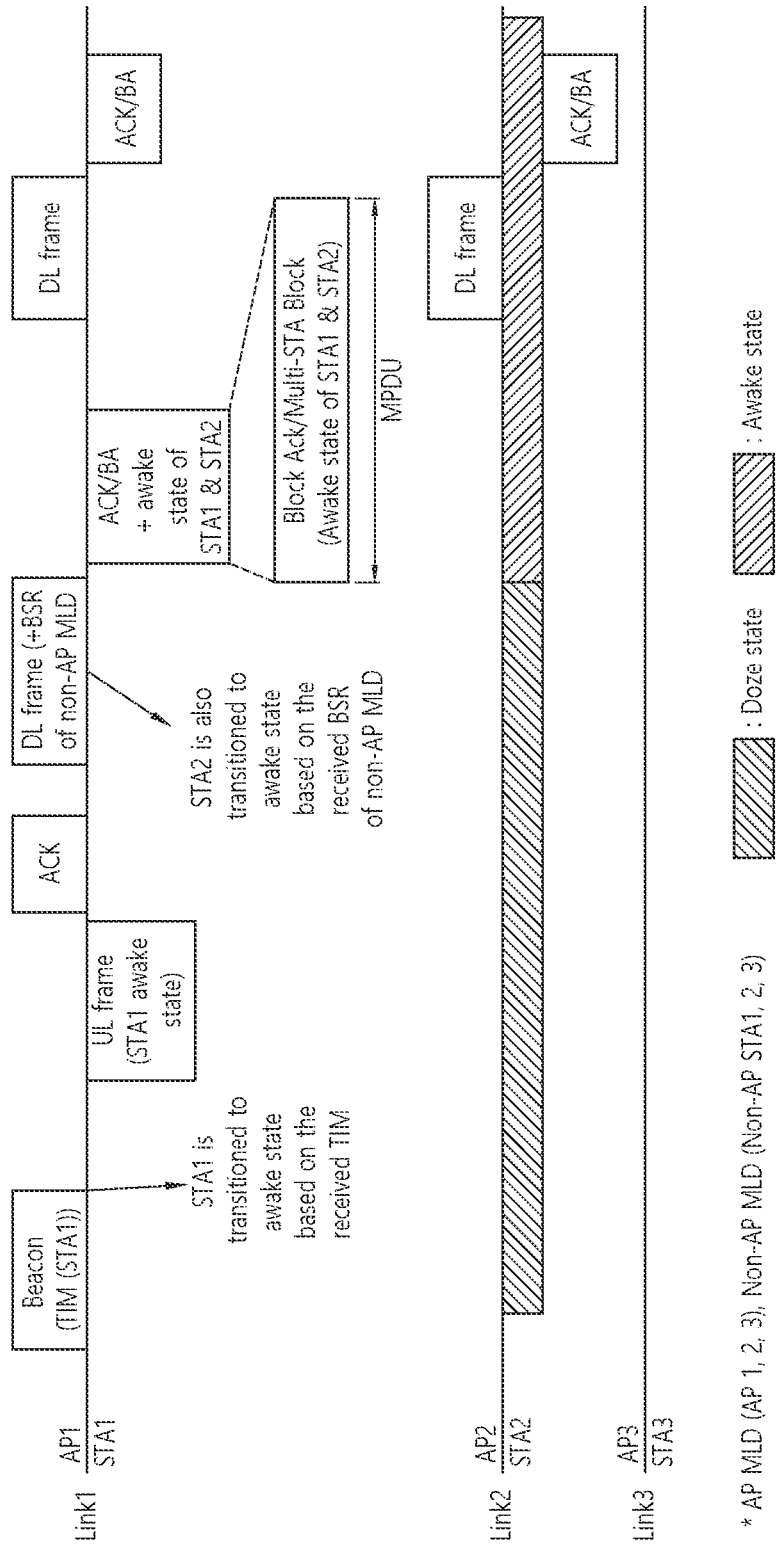
FIG. 22 is a diagram illustrating an embodiment of a power state transmission method according to method 2).

2) Power state transition information (e.g., information indicating which STAs have transitioned to the awake state (or to the doze state)) is included in the Block Ack frame, Ack frame, or Multi-STA BlockAck frame and transmitted. FIG. 22 is a diagram illustrating an embodiment of a power state transmission method according to the method 2).

Figure 23:
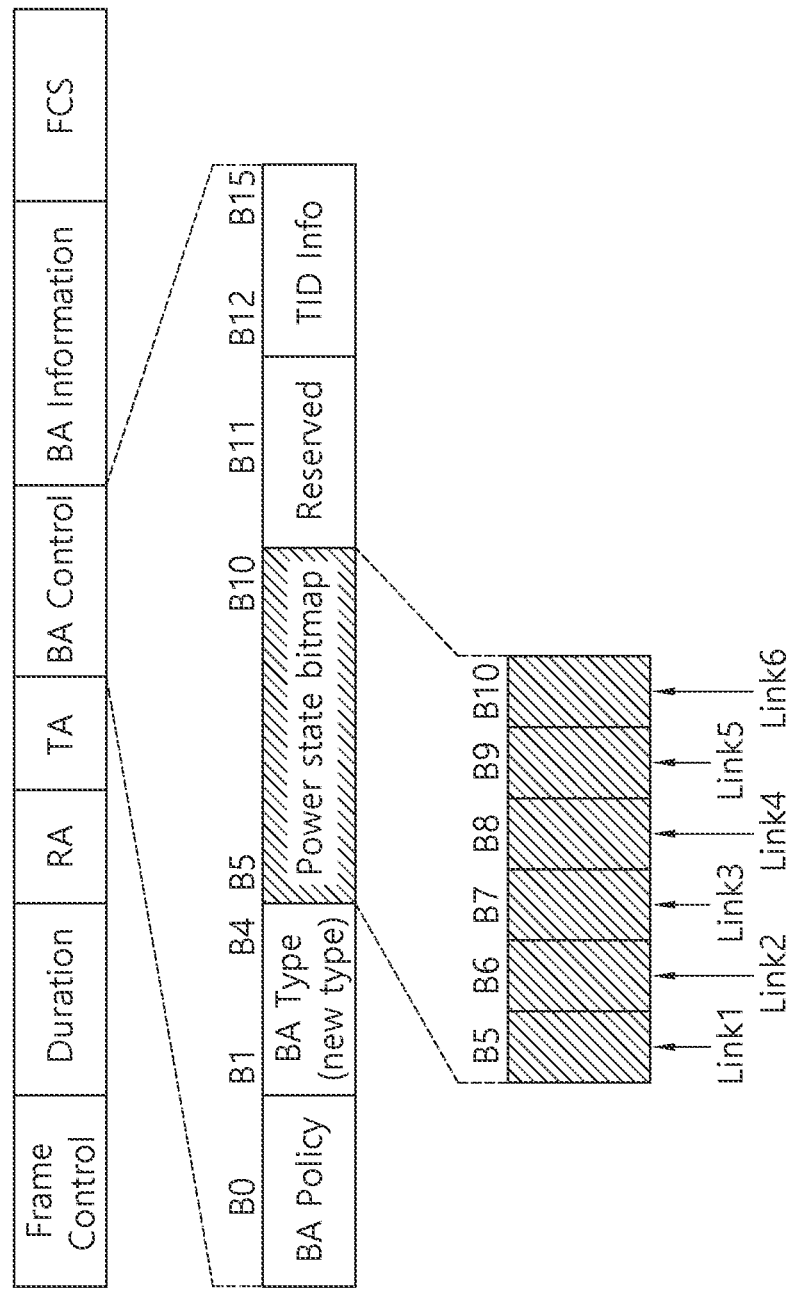
FIG. 23 is a diagram illustrating an example of a Block Ack frame including power state information.

FIG. 23 is a diagram illustrating an example of a Block Ack frame including power state information.

Referring to FIG. 23, when the BA Type field includes information related to the new Type, the BA Control field can include a power state bitmap, and each bit in the bitmap can indicate the power state of STAs for a link corresponding to each bit. A bit set to '1' may mean that the STA corresponding to the link for the bit set to '1' is in an awake state.

Instead of putting the Power state link bitmap in the BA Control field, it can be included in the BA Information (for example, the first part or the last part).

Figure 24:
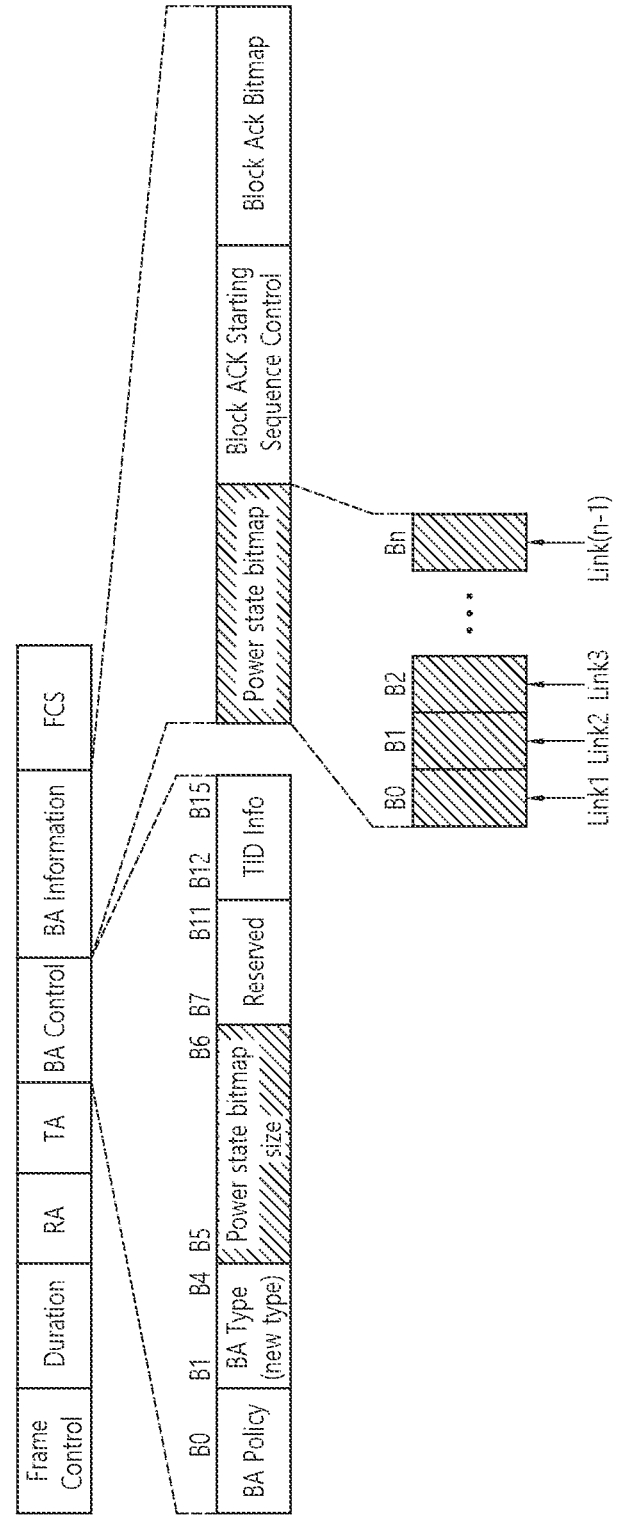
FIG. 24 is a diagram illustrating an example of a Block Ack frame including power state information.

FIG. 24 is a diagram illustrating an example of a Block Ack frame including power state information.

Referring to FIG. 24, some of the Reserved fields of the BA Control field may be used to indicate the power state bitmap size. For example, the power state bitmap size field may have a size of 2 bits. If the size of the power state bitmap field can be changed according to definition, an example for this is shown below.

Power state bitmap size field (1 bit):
0: Indicates that the power state bitmap with the size of 8 bits (1 byte) is included in BA Information
1: Indicates that the power state bitmap having a size of 16 bits is included in BA Information Power state bitmap size field (2 bits):
0: Indicates that Power state bitmap having a size of 4 bits size is included in BA Information
1: Indicates that the power state bitmap having a size of 8 bits is included in BA Information
2: Indicates that the power state bitmap having a size of 12 bits is included in BA Information
3: Indicates that the power state bitmap having a size of 16 bits is included in BA Information Power state bitmap size field (2 bits):
0: Indicates that Power state bitmap having a size of 8 bits is included in BA Information
1: Indicates that the Power state bitmap having a size of 16 bits is included in BA Information
2: Indicates that the Power state bitmap with the size of 24 bits is included in the BA Information
3: Indicates that the Power state bitmap having a size of 32 bits is included in BA Information Power state bitmap size field (3 bit):
0: Indicates that Power state bitmap having a size of 4 bits is included in BA Information
1: Indicates that the power state bitmap having a size of 8 bits is included in BA Information
2: Indicates that the power state bitmap having a size of 12 bits is included in BA Information
3: Indicates that the power state bitmap having a size of 16 bits is included in BA Information
4: Indicates that the power state bitmap having a size of 20 bits is included in the BA Information
5: Indicates that the power state bitmap having a size of 24 bits is included in BA Information
6: Indicates that the power state bitmap with the size of 28 bits is included in the BA Information
7: Indicates that the Power state bitmap having a size of 32 bits is included in BA Information The size above is an example. If a Bitmap can have different sizes, it can have different values for each size, and the position can also be located at a place other than the front.

The BA Type may be newly defined, or an existing BA Type (e.g., Compressed BA, Multi-STA BA, Multi-TID BA, etc.) may be used. Some of the reserved bits of the BA Control field may indicate whether the above information is included.

Figure 25:
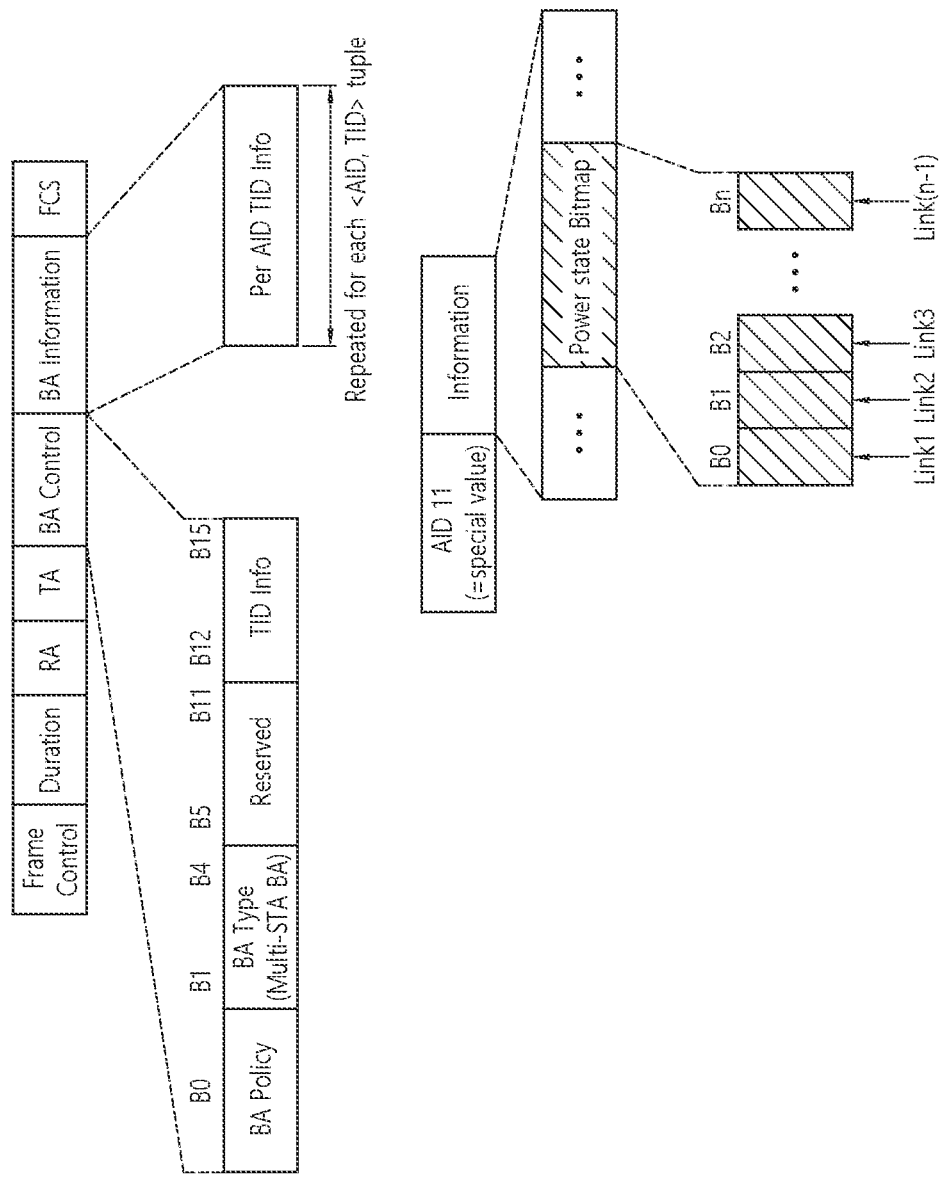
FIG. 25 to FIG. 27 are diagrams illustrating an embodiment of power state information.

FIG. 25 is a diagram illustrating an embodiment of power state information.

Referring to FIG. 25, the MLD may transmit power state information (e.g., awake state or doze state) of a UE existing in another link within the same MLD using a Multi-STA BlockAck Variant.

For example, if the BA type of the BA frame is related to a Multi-STA BA, the BA frame may include a Per AID TID Info field. The Per AID TID Info field may be repeated for each AID or TID. That is, the Per AID TID Info field may include information related to each AID/TID for each AID/TID. For example, the Per AID TID Info field may include a first AID information field and a second AID information field, and the first AID information field includes information related to a first AID and an STA corresponding to the first AID, can do. The second AID information field may include information related to a second AID and an STA corresponding to the second AID. For example, the first AID information field may include an AID11 field and an Information field. For example, the second AID information field may include an AID11 field and an Information field.

For example, when the AID11 field of the Per AID TID Info field indicates a specific value (e.g., one of values larger than 2007), the Information field may include an AID Power State Bitmap. That is, when the AID11 field has a specific value, the Information field contiguous to the AID11 field having a specific value may include power state information (i.e., awake state or doze state) of STAs included in the MLD transmitting the BA frame. For example, the power state information may be indicated for each link or for each STA.

For example, when the AID11 field of the Per AID TID Info field indicates the AID of a specific STA, an Information field contiguous to the AID11 field may include ACK information related to the specific STA.

Figure 26:
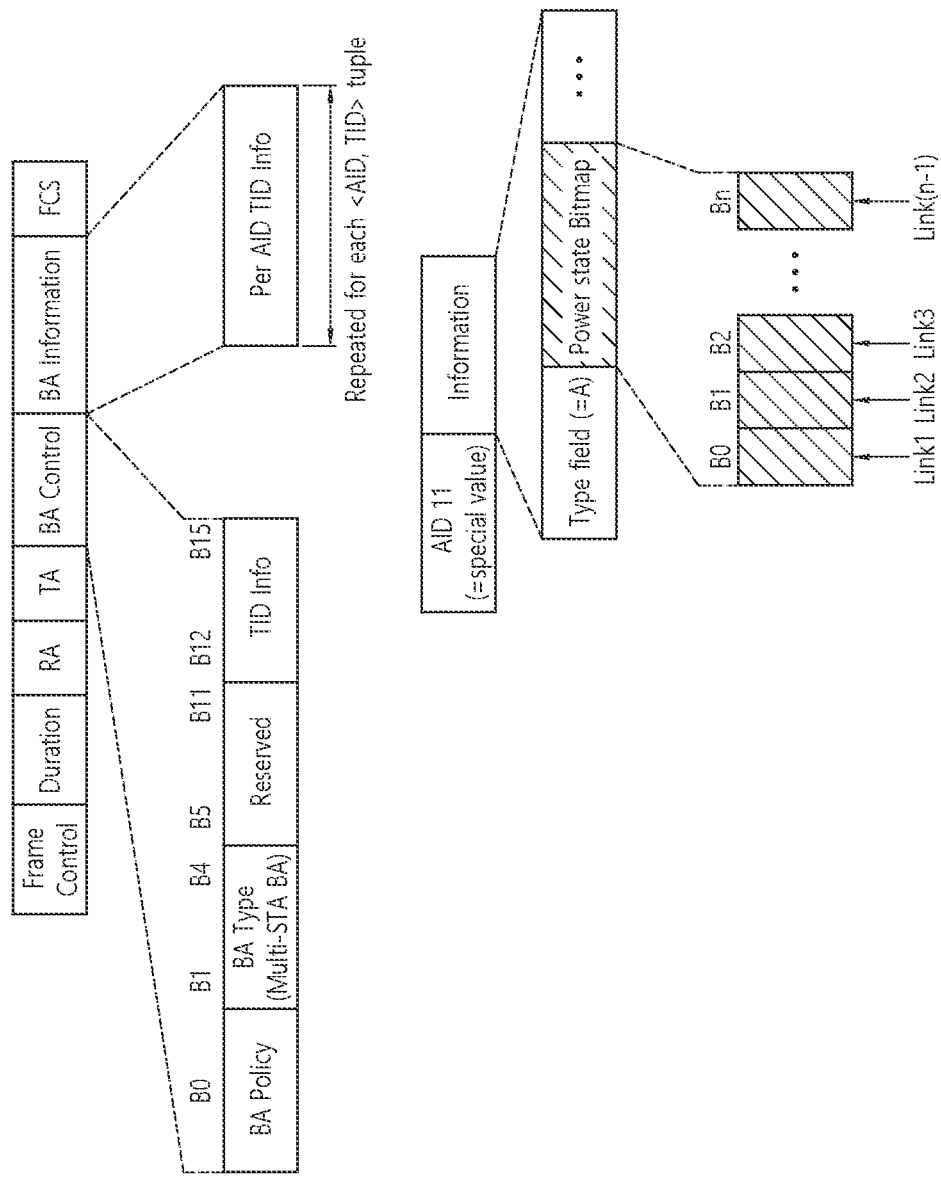

FIG. 26 is a diagram illustrating an embodiment of power state information.

Referring to FIG. 26, when the AID11 field has a specific value, the type field may be included in the Information field of the BA frame. For example, when the value of the AID11 field indicates a first value (e.g., one of values greater than 2007), a Type field contiguous to the AID11 field may be included, and when the Type field indicates a second value (e.g., when indicating a specific value indicating that power state information is included), a power state bitmap may be included.

Figure 27:
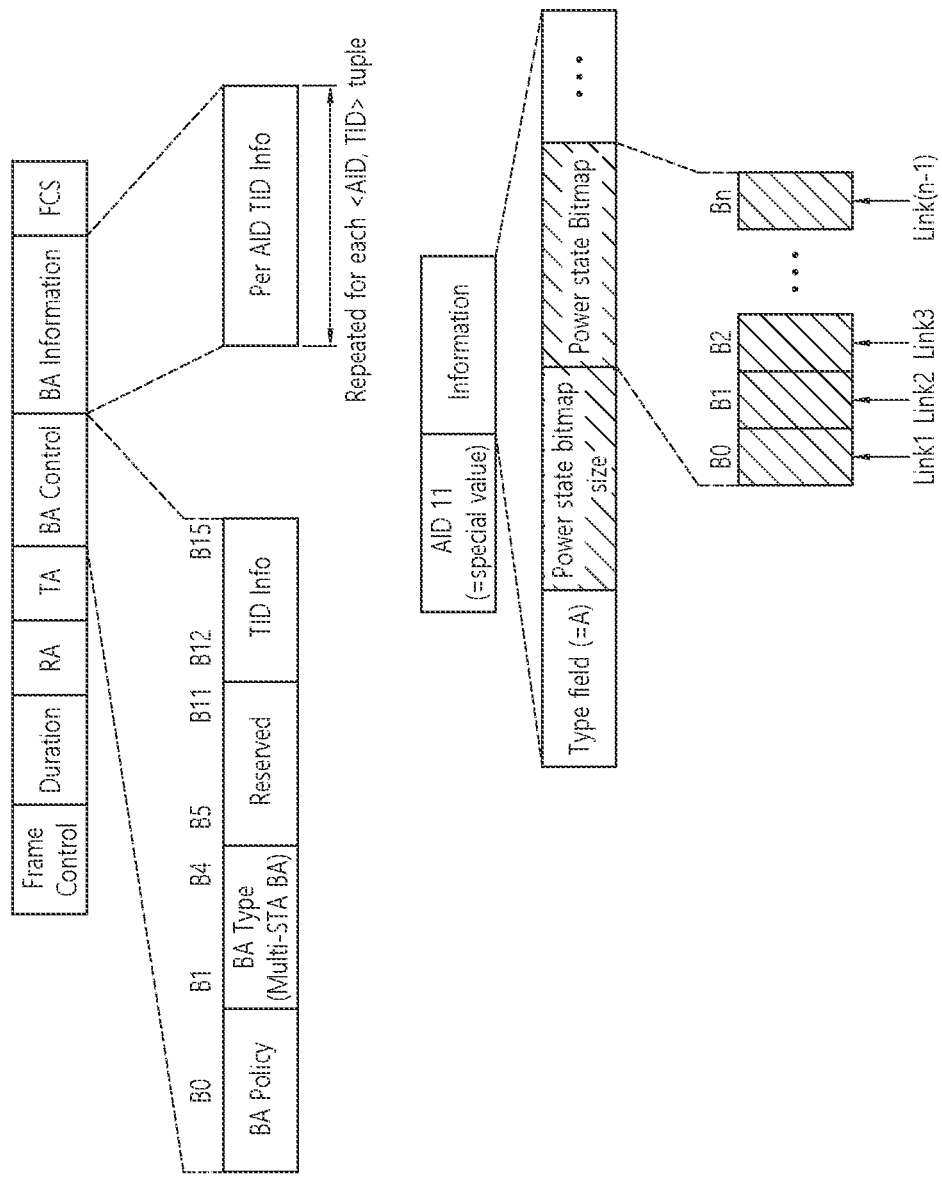

FIG. 27 is a diagram illustrating an embodiment of power state information.

Referring to FIG. 27, a field indicating the size of the power state bitmap may be additionally included in the Per AID TID Info field of the BA frame. The power state bitmap size field may include information related to the size of the power state bitmap, and the power state bitmap is configured based on the power state bitmap size field. That is, a power state bitmap having a size equal to the value indicated by the power state bitmap size field may be configured. That is, the size of the power state bitmap may be determined based on the power state bitmap size field.

Information related to the power state may be included in a format other than the above format. In addition, although each bit indicates a link in the Power State Bitmap, each bit may indicate an STA mapped to a link. That is, in the embodiments of FIGS. 25 to 27, each bit of the power state bitmap is shown as corresponding to the power state of each link (e.g., link 1, link 2, etc.), but each bit of the power state bitmap Information related to the power state of each STA included in the MLD may be included.

Figure 28:
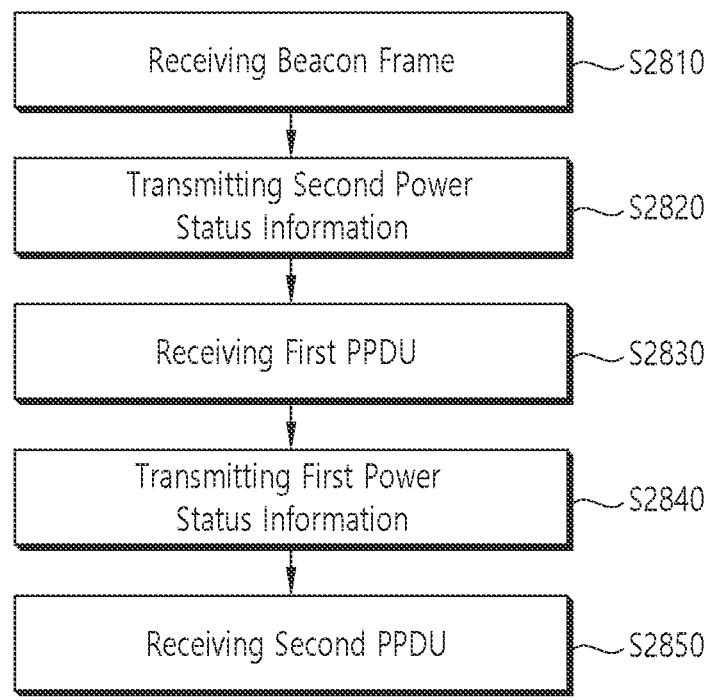
FIG. 28 is a diagram illustrating an embodiment of a receiving MLD operation method.

FIG. 28 is a diagram illustrating an embodiment of a receiving MLD operation method.

Referring to FIG. 28, a receiving MLD may include a plurality of receiving stations (STAs).

The receiving MLD may receive the beacon frame (S2810). For example, the receiving MLD may receive a beacon frame from the transmitting MLD. For example, the beacon frame may include traffic indication map (TIM) information.

The receiving MLD may transmit second power state information (S2820). For example, the receiving MLD may transmit a frame including second power state information for an STA that has transitioned from a doze state to an awake state based on the TIM information to the transmitting MLD.

The receiving MLD may receive the first PPDU (S2830). For example, the receiving MLD may receive a first physical protocol data unit (PPDU) from the transmitting MLD.

For example, the first PPDU may include buffer information related to the amount of data to be transmitted from the transmitting MLD to the receiving MLD.

For example, the first PPDU may include buffer information related to an amount of data to be transmitted from the transmitting MLD to the receiving MLD, and the first power state information may be determined based on the buffer information.

For example, the first power state information may be included in a BA control subfield of the BA frame and may include information related to whether STAs operating in each link are in an awake state or doze state.

The receiving MLD may transmit first power state information (S2840). For example, the receiving MLD may transmit a block acknowledgment (BA) frame for the first PPDU to the transmitting MLD. For example, the BA frame may include a first association identifier (AID) information field and a second AID information field. The first AID information field may include a first AID field related to the AID of the transmission MLD and an ACK information field for the data. The second AID information field may include a power state information field related to whether the plurality of receiving STAs are in an awake state or a doze state based on the second AID field and the second AID field having a first value The receiving MLD may receive the second PPDU (S2850). For example, the receiving MLD may receive the second PPDU from the transmitting MLD through the receiving STA in an awake state based on the power state information.

Figure 29:
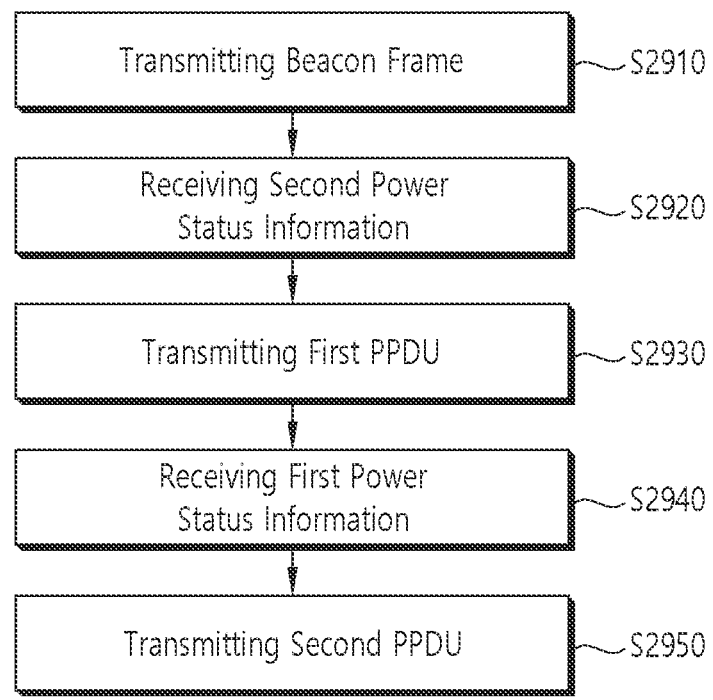
FIG. 29 is a diagram illustrating an embodiment of a transmission MLD operation method.

FIG. 29 is a diagram illustrating an embodiment of a transmission MLD operation method.

Referring to FIG. 29, a receiving MLD may include a plurality of receiving STAs.

The transmitting MLD may transmit a beacon frame (S2910). For example, the transmitting MLD may transmit a beacon frame to the receiving MLD. For example, the beacon frame may include traffic indication map (TIM) information.

The transmitting MLD may receive second power state information (S2920). For example, the transmitting MLD may receive a frame including second power state information for an STA that has transitioned from a doze state to an awake state based on the TIM information from the receiving MLD.

The transmitting MLD may transmit the first PPDU (S2930). For example, the transmitting MLD may transmit a first physical protocol data unit (PPDU) to the receiving MLD.

For example, the first PPDU may include buffer information related to the amount of data to be transmitted from the transmitting MLD to the receiving MLD.

For example, the first PPDU may include buffer information related to an amount of data to be transmitted from the transmitting MLD to the receiving MLD, and the first power state information may be determined based on the buffer information.

For example, the first power state information may be included in a BA control subfield of the BA frame and may include information related to whether STAs operating in each link are in an awake state or doze state.

The transmitting MLD may receive first power state information (S2940). For example, the transmitting MLD may receive a block acknowledgment (BA) frame for the first PPDU from the receiving MLD. For example, the BA frame may include a first association identifier (AID) information field and a second AID information field. The first AID information field may include a first AID field related to the AID of the transmission MLD and an ACK information field for the data. The second AID information field may include a power state information field related to whether the plurality of receiving STAs are in an awake state or a doze state based on the second AID field and the second AID field having a first value.

The transmitting MLD may transmit the second PPDU (S2950). For example, the transmitting MLD may transmit the second PPDU to the receiving STA in an awake state based on the power state information.

Some of the detailed steps shown in the examples of FIGS. 28 and 29 may not be essential steps and may be omitted. In addition to the steps shown in FIGS. 28 and 29, other steps may be added, and the order of the steps may be changed. Some of the above steps may have their own technical meaning.

The technical features of the present specification described above may be applied to various devices and methods. For example, the technical features of the present specification described above may be performed/supported through the device of FIGS. 1 and/or 5. For example, the technical features of the present specification described above may be applied only to a part of FIGS. 1 and/or 5. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 5. The present specification proposes an apparatus comprising: a memory; and a processor coupled to the memory, wherein the processor is adapted to: receive, from a transmitting MLD, a first physical protocol data unit (PPDU) including data; and transmit a block acknowledgment (BA) frame for the first PPDU to the transmitting MLD, wherein the BA frame includes a first association identifier (AID) information field and a second AID information field, wherein the first AID information field includes a first AID field related to an AID of the transmitting MLD and an ACK information field for the data, wherein the second AID information field includes a power state information field related to whether the plurality of receiving STAs are in an awake state or a doze state based on the second AID field having a first value.

Technical features of the present specification may be implemented based on a computer readable medium (CRM). The present specification proposes at least one computer readable medium (CRM) storing instructions that, based on being executed by at least one processor of a receiving multi-link device (MLD) of a wireless local area network (WLAN) system, perform operations comprising: wherein the receiving MLD includes a plurality of receiving stations (STAs), receiving, from a transmitting MLD, a first physical protocol data unit (PPDU) including data; and transmitting a block acknowledgment (BA) frame for the first PPDU to the transmitting MLD, wherein the BA frame includes a first association identifier (AID) information field and a second AID information field, wherein the first AID information field includes a first AID field related to an AID of the transmitting MLD and an ACK information field for the data, wherein the second AID information field includes a power state information field related to whether the plurality of receiving STAs are in an awake state or a doze state based on the second AID field having a first value.

Instructions stored in the CRM of the present specification may be executed by at least one processor. At least one processor related to the CRM of the present specification may be the processors 111 and 121 or the processing chips 114 and 124 of FIG. 1 or the processor 610 of FIG. 5. Meanwhile, the CRM of this specification may be the memories 112 and 122 of FIG. 1, the memory 620 of FIG. 5, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a receiving multi-link device (MLD) of a wireless local area network (WLAN) system, the method comprising:
   receiving, from a transmitting MLD, a first physical protocol data unit (PPDU) including data, wherein the receiving MLD includes a plurality of receiving stations (STAs); and
   transmitting a block acknowledgment (BA) frame for the first PPDU to the transmitting MLD,
   wherein the BA frame includes a first association identifier (AID) information field and a second AID information field,
   wherein the first AID information field includes a first AID field related to an AID of the transmitting MLD and an ACK information field for the data,
   wherein the second AID information field includes a power state information field related to whether the plurality of receiving STAs are in an awake state or a doze state based on the second AID field having a first value.

2. The method of claim 1, wherein the BA frame is a multi-STA BA frame.

3. The method of claim 1, wherein the second AID information field further includes a field related to a size of the power state information field.

4. The method of claim 1, wherein the second AID information field includes a type field based on the second AID field having the first value, and
wherein the second AID information field includes the power state information field based on the type field having a second value.

5. The method of claim 1, wherein the first PPDU includes buffer information related to an amount of data to be transmitted by the transmitting MLD to the receiving MLD, and
wherein the power state information field is determined based on the buffer information.

6. The method of claim 1, further comprising:
receiving a beacon frame from the transmitting MLD, wherein the beacon frame includes traffic indication map (TIM) information; and
transmitting, to the transmitting MLD, a frame including second power state information for an STA that has transitioned from a doze state to an awake state based on the TIM information;
wherein the first PPDU includes buffer information related to an amount of data to be transmitted by the transmitting MLD to the receiving MLD, and
wherein the second power state information is determined based on the buffer information.

7. The method of claim 1, further comprising:
receiving a second PPDU from the transmitting MLD through a receiving STA in an awake state based on the power state information field.

8. A receiving multi-link device (MLD) of a wireless local area network (WLAN) system, comprising:
a plurality of receiving stations (STAs); and
a processor coupled to the transceiver plurality of the receiving STAs,
wherein the processor is adapted to:
receive, from a transmitting MLD, a first physical protocol data unit (PPDU) including data; and
transmit a block acknowledgment (BA) frame for the first PPDU to the transmitting MLD,
wherein the BA frame includes a first association identifier (AID) information field and a second AID information field,
wherein the first AID information field includes a first AID field related to an AID of the transmitting MLD and an ACK information field for the data,
wherein the second AID information field includes a power state information field related to whether the plurality of receiving STAs are in an awake state or a doze state based on the second AID field having a first value.

9. The receiving MLD of claim 8, wherein the BA frame is a multi-STA BA frame.

10. The receiving MLD of claim 8, wherein the second AID information field further includes a field related to a size of the power state information field.

11. The receiving MLD of claim 8, wherein the second AID information field includes a type field based on the second AID field having the first value, and
wherein the second AID information field includes the power state information field based on the type field having a second value.

12. The receiving MLD of claim 8, wherein the first PPDU includes buffer information related to an amount of data to be transmitted by the transmitting MLD to the receiving MLD, and
wherein the power state information field is determined based on the buffer information.

13. The receiving MLD of claim 8, wherein the processor is further adapted to:
receive a beacon frame from the transmitting MLD, wherein the beacon frame includes traffic indication map (TIM) information; and
transmit, to the transmitting MLD, a frame including second power state information for an STA that has transitioned from a doze state to an awake state based on the TIM information;
wherein the first PPDU includes buffer information related to an amount of data to be transmitted by the transmitting MLD to the receiving MLD, and
wherein the second power state information is determined based on the buffer information.

14. The receiving MLD of claim 8, wherein the processor is further adapted to:
receive a second PPDU from the transmitting MLD through a receiving STA in an awake state based on the power state information field.

15. A method performed by a transmitting multi-link device (MLD) of a wireless local area network (WLAN) system, the method comprising:
transmitting, to a receiving MLD, a first physical protocol data unit (PPDU) including data, wherein the receiving MLD includes a plurality of receiving stations (STAs),
receiving, from the receiving MLD, a block acknowledgment (BA) frame for the first PPDU,
wherein the BA frame includes a first association identifier (AID) information field and a second AID information field,
wherein the first AID information field includes a first AID field related to an AID of the transmitting MLD and an ACK information field for the data,
wherein the second AID information field includes a power state information field related to whether the plurality of receiving STAs are in an awake state or a doze state based on the second AID field having a first value.

* * * * *